United States Patent
Holt et al.

(10) Patent No.: US 6,289,065 B1
(45) Date of Patent: *Sep. 11, 2001

(54) FIFO STATUS INDICATOR

(75) Inventors: Nancy Holt; Stephen M. Johnson, both of Colorado Springs, CO (US)

(73) Assignee: Hyundai Electronics America, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/783,782

(22) Filed: Jan. 15, 1997

Related U.S. Application Data

(63) Continuation of application No. 08/145,912, filed on Oct. 29, 1993.

(51) Int. Cl.[7] ............................. H04L 7/00; H04L 25/00; G06F 12/00

(52) U.S. Cl. ......................... 375/372; 375/371; 711/155

(58) Field of Search .............................. 375/371, 372, 375/354, 355, 357, 359; 711/144, 149, 156, 155; 370/229, 230, 231, 232, 236, 235; 365/185.01; 358/404, 444

(56) References Cited

U.S. PATENT DOCUMENTS

| | | | |
|---|---|---|---|
| 4,159,532 | * | 6/1979 | Getson, Jr. et al. ............... 364/900 |
| 4,525,849 | * | 6/1985 | Wolf ................................. 375/118 |
| 4,596,026 | * | 6/1986 | Cease et al. ...................... 375/371 |
| 4,694,426 | | 9/1987 | Mason ............................... 365/78 |
| 4,718,074 | * | 1/1988 | Mannas et al. .................... 375/371 |
| 4,873,703 | * | 10/1989 | Crandall et al. .................. 375/118 |
| 4,907,186 | | 3/1990 | Racey ............................... 364/900 |
| 4,933,901 | * | 6/1990 | Tai et al. ........................ 365/189.01 |
| 4,965,794 | * | 10/1990 | Smith .............................. 370/105.1 |
| 5,134,562 | * | 7/1992 | Hattori et al. ................... 395/400 |
| 5,311,511 | * | 5/1994 | Reilly et al. ..................... 370/84 |

FOREIGN PATENT DOCUMENTS

| | | |
|---|---|---|
| 4012707 | 11/1989 | (EP) . |
| 4801877 | 6/1991 | (EP) . |

OTHER PUBLICATIONS

IBM Technical Disclosure Bulletin, vol. 15, No. 9, dated Feb., 1989, pp. 4722–4727.

IBM Technical Disclosure Bulletin, vol. 12, No. 11, dated Apr., 1970, pp. 2036–2037.

* cited by examiner

Primary Examiner—Madeleine Nguyen
(74) Attorney, Agent, or Firm—Townsend and Townsend and Crew LLP

(57) ABSTRACT

The invention relates to data transfers between devices having asynchronous clocks. A FIFO having multiple levels holds the data while en route from a sender to a receiver. The invention monitors the FIFO. When all levels become full, the invention issues a FIFO_FULL signal. When all levels become empty, the invention issues a FIFO_EMPTY signal. In these signals, there are four events whose timing is important. (1) The ACTUATION of the FIFO_FULL is immediate; (2) the ACTUATION of the FIFO_EMPTY signal is immediate; (3) the DE-ACTUATION of the FIFO_FULL signal is synchronous with the clock of the computer reading the FIFO; (4) the DE-ACTUATION of the FIFO_EMPTY signal is synchronous with the clock of the computer writing to the FIFO. The invention allows throughput through the FIFO to proceed at a very high speed, even though the sender and receiver are asynchronous.

1 Claim, 36 Drawing Sheets

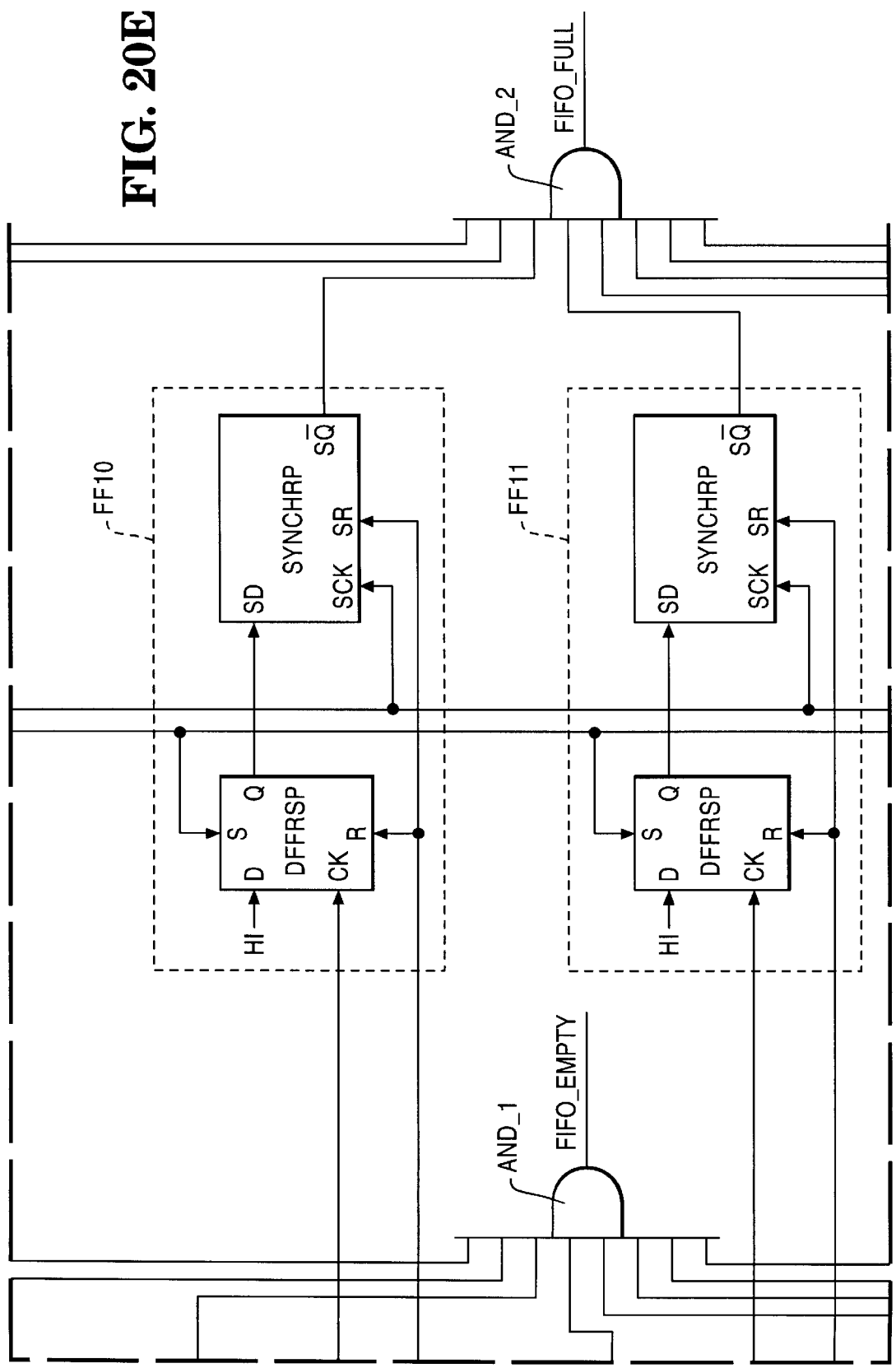

FIFO STATUS INDICATOR

This is a continuation of application Ser. No. 08,145,912 filed Oct. 29, 1993.

The invention relates to a status indicator which indicates the status (empty or full) of a First In, First Out (FIFO) register used in the transfer of data between two computers. The status indicator produces two outputs, which are synchronized to two different clocks.

BACKGROUND OF THE INVENTION

There are numerous different ways for a computer, named B, to transfer data to a computer, A. For example, if the two computers operate at different clock frequencies, they may use a FIFO (First In, First Out) buffer for the transfer. The FIFO is a holding station for the data while en route from computer B to computer A.

The FIFO may be viewed as a pipeline. Computer B, the sender, loads a sequence of data words, such as W1, followed by W2, then W3, and so on, into the pipeline. The pipeline holds the data words, and makes them available to computer A in serial fashion. Computer A, the receiver, reads data from the pipeline in the same order as they were loaded: W1 first, W2 next, and so on.

The fact that the order of reading the FIFO, by computer A, is the same as the order of loading, by computer B, gives rise to the name "First In, First Out."

Two problems arise in such an approach. First, the FIFO has a limited capacity. The sender must not attempt to load data words into a fully loaded FIFO. Second, the receiver must not attempt to read data words from an empty FIFO.

There are several approaches to solving these problems. One is to divide the data into blocks which are exactly the size of the FIFO. For example, if the FIFO holds eight words, the sender fully loads the FIFO with a burst of eight data words. Then, the sender waits an appropriate length of time, while the receiver reads the eight words. Then the sender loads another eight words.

Plainly, this approach imposes a delay on the transfer.

Another approach will be explained with reference to FIG. 1. Assume that a COUNTER produces an output which indicates the number of words presently contained in the FIFO. (FIG. 1 indicates a 74–193 COUNTER, which is commercially available.)

Before any data words are loaded into the FIFO, the counter output is set to 0000, as indicated by the sketch in the upper left quadrant of FIG. 1. Assume that the SENDER, B, places four words, W1 through W4, into the FIFO, as indicated in the upper right quadrant of FIG. 1.

As each word is loaded, the SENDER issues a pulse to the COUNT UP input of the COUNTER. Each pulse increments the COUNTER's output. The final output is 0100 (which equals 4 in decimal notation). The COUNTER's output of 0100 indicates that it contains four words.

Then the RECEIVER reads the words. As the RECEIVER reads each word, it issues a pulse to the COUNT DOWN input of the COUNTER, as shown in the lower left quadrant of the Figure. Each pulse decrements the COUNTER's output. The final output of the COUNTER is 0000, as indicated in the lower right quadrant, showing that the FIFO is empty.

A problem with this approach is that the SENDER cannot apply its COUNT UP pulse while the RECEIVER simultaneously applies its COUNT DOWN pulse. The COUNTER cannot respond to these contradictory pulses. Some arbitrator must be provided which prevents simultaneous COUNT UP and COUNT DOWN signals, thereby preventing the SENDER from loading data while the RECEIVER is reading data.

OBJECTS OF THE INVENTION

It is an object of the invention to provide improved data transfer between a sender and a receiver.

It is a further object of the invention to provide a system which monitors the status of a FIFO buffer used in data transfer, and produces full- and empty signals in accordance with the status of the FIFO.

SUMMARY OF THE INVENTION

In one form of the invention, a FIFO is used as a buffer to hold data while en route from a sender to a receiver. The sender and receiver are asynchronous. The invention monitors the status (empty or full) of each level of the FIFO, and issues a FIFO_FULL signal when all levels are full, and a FIFO_EMPTY signal when all levels are empty. Each signal is synchronous with one of the respective clocks of the sender or receiver.

BRIEF DESCRIPTION OF THE DRAWINGS

FIG. 1 is the creation of the Inventor.

DETAILED DESCRIPTION OF THE INVENTION

A significant feature of the invention is the synchronization of the signals produced by a status indicator for a FIFO. However, discussion of the synchronization will be postponed. First, an explanation of the concept of FIFO status will be given, and an explanation of how the status signals are generated.

Figures 20, 20A:
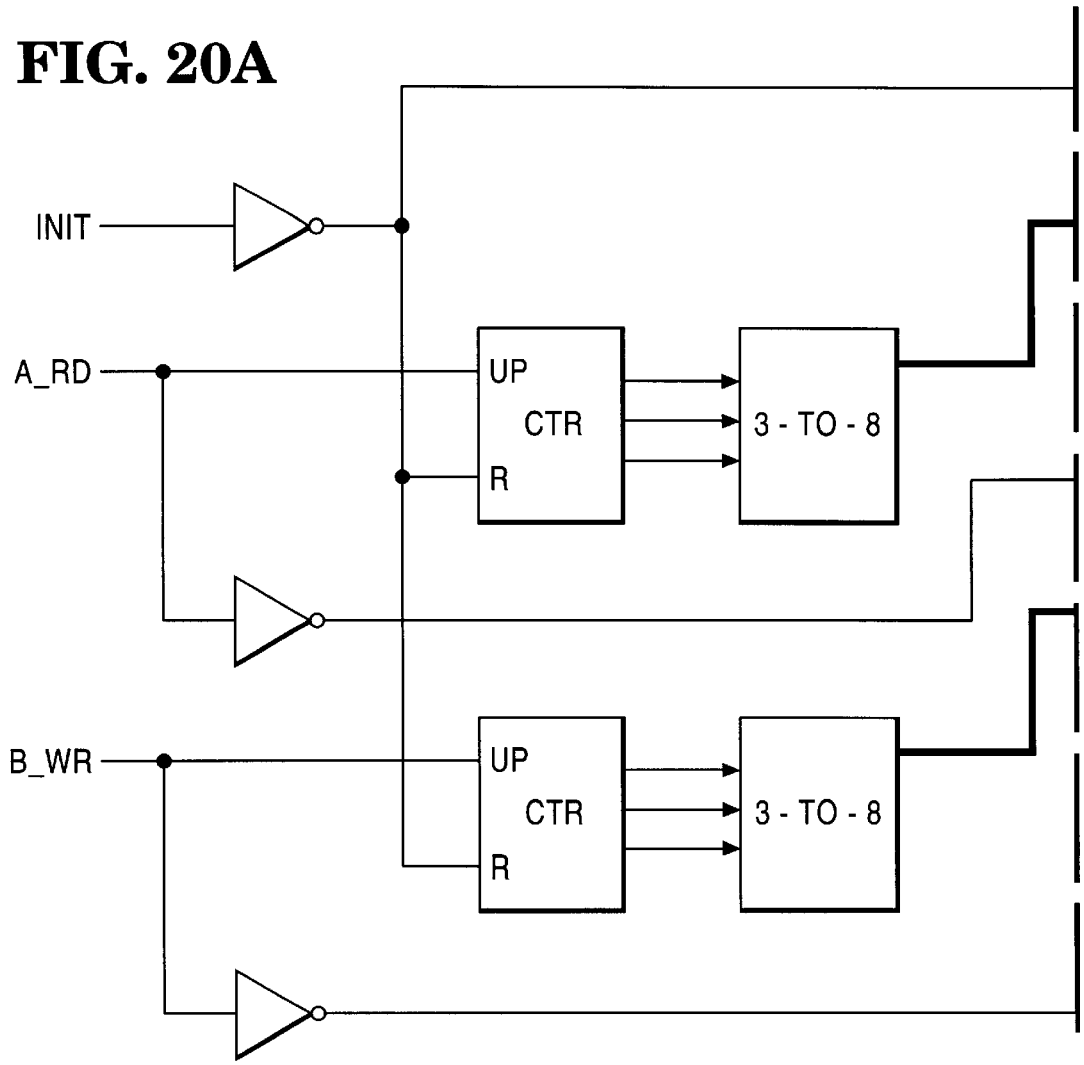
FIG. 20 illustrates one form of the invention.
Figure 20B:
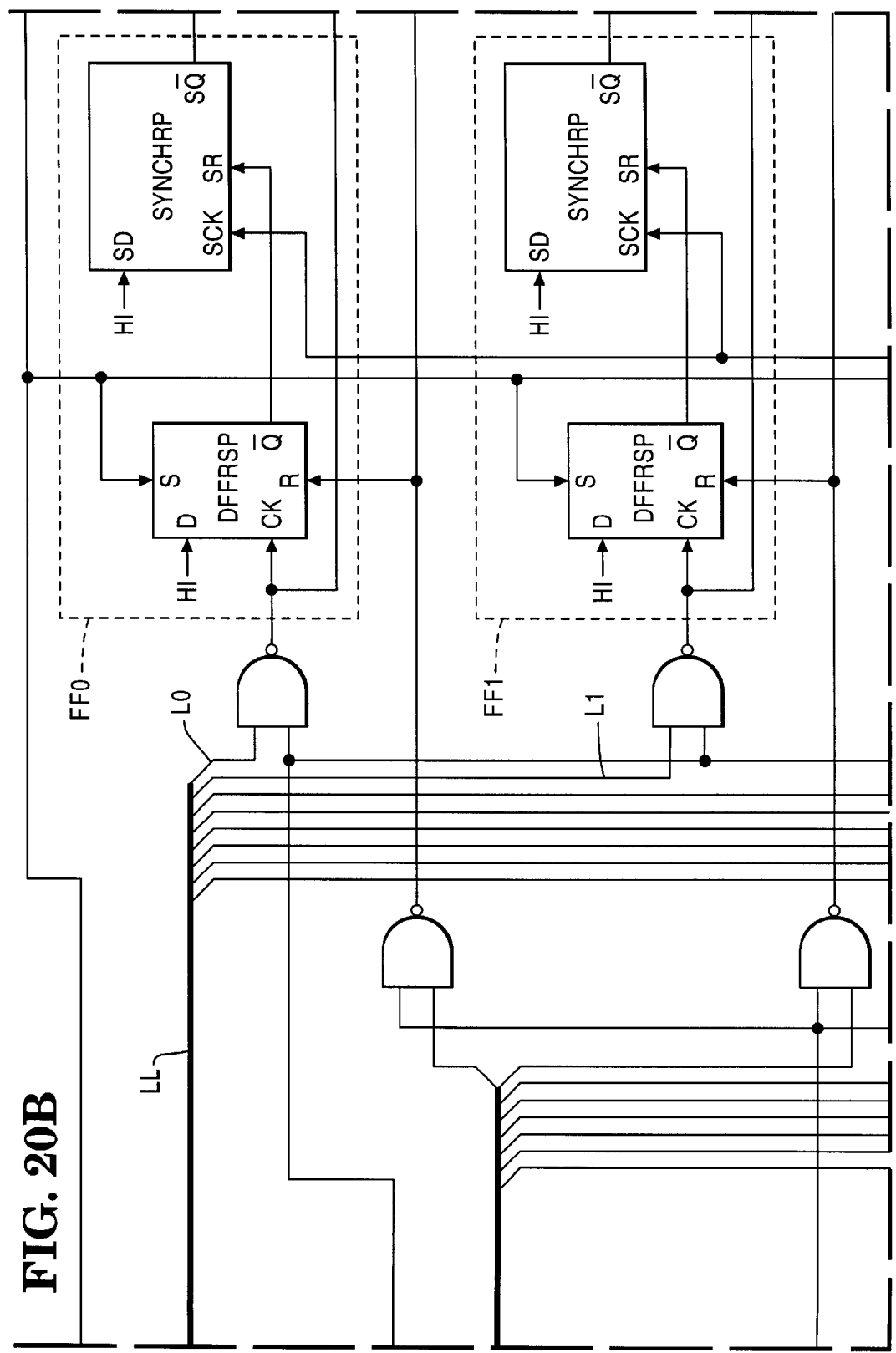
Figure 20C:
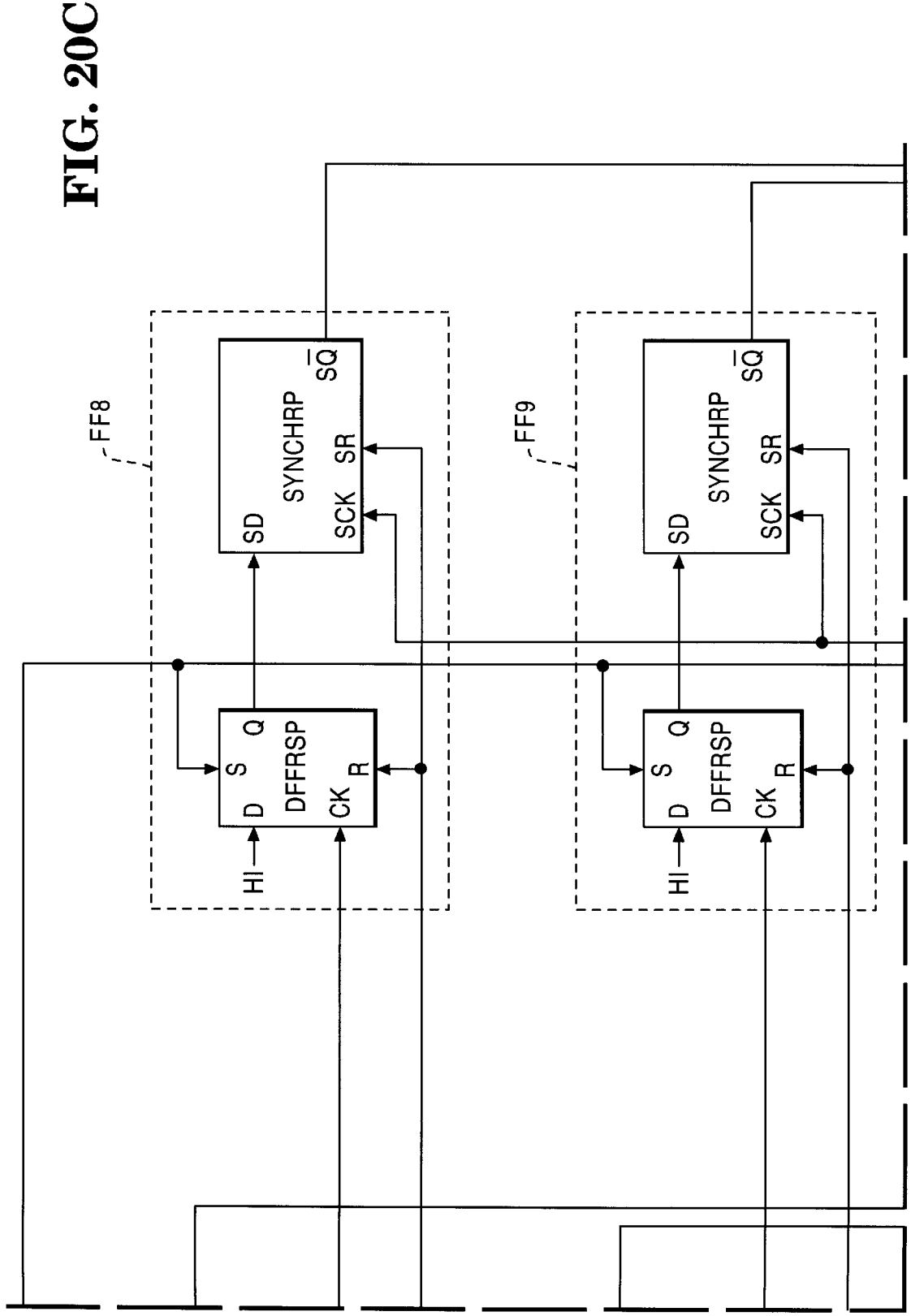
Figure 20D:
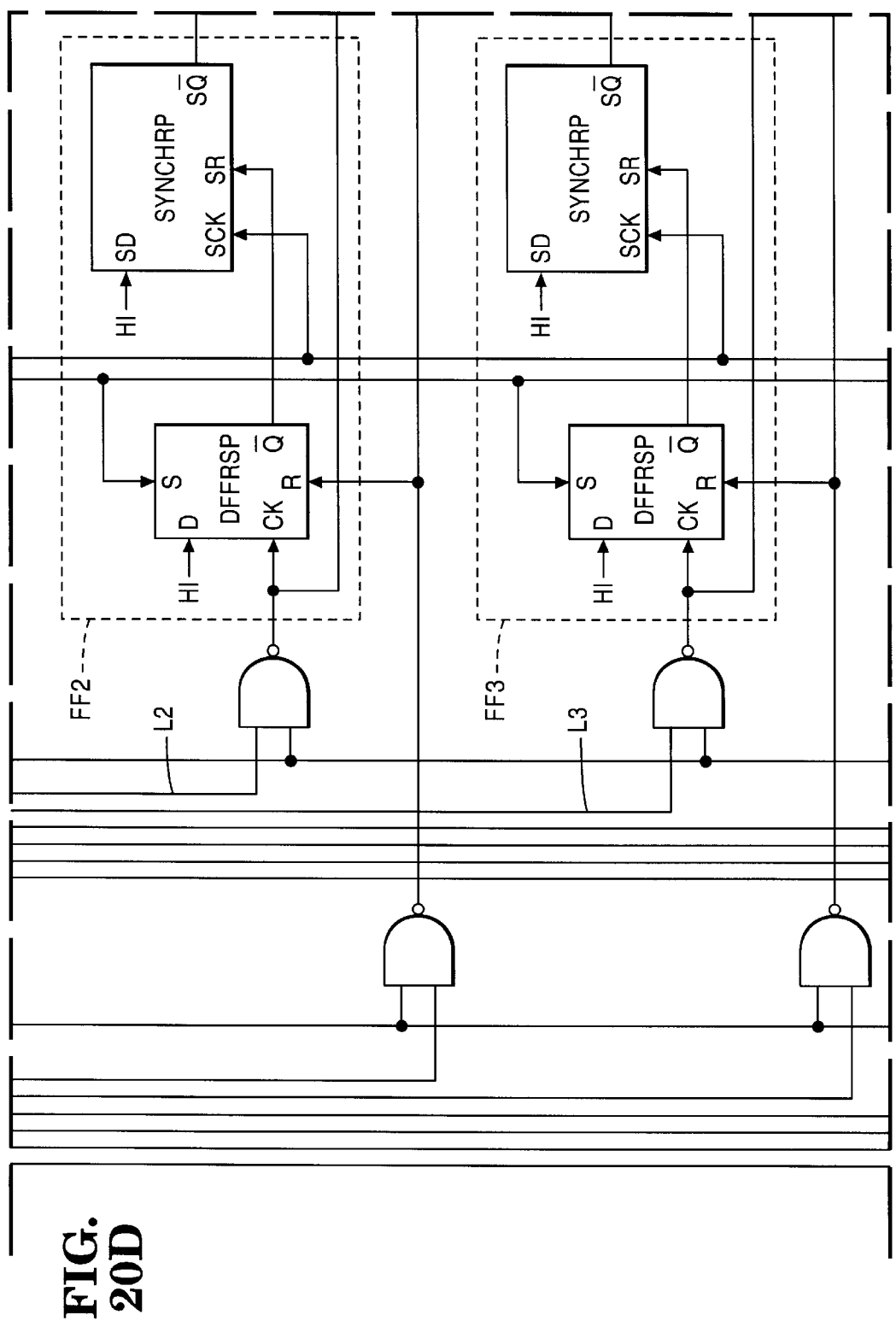
Figure 20F:
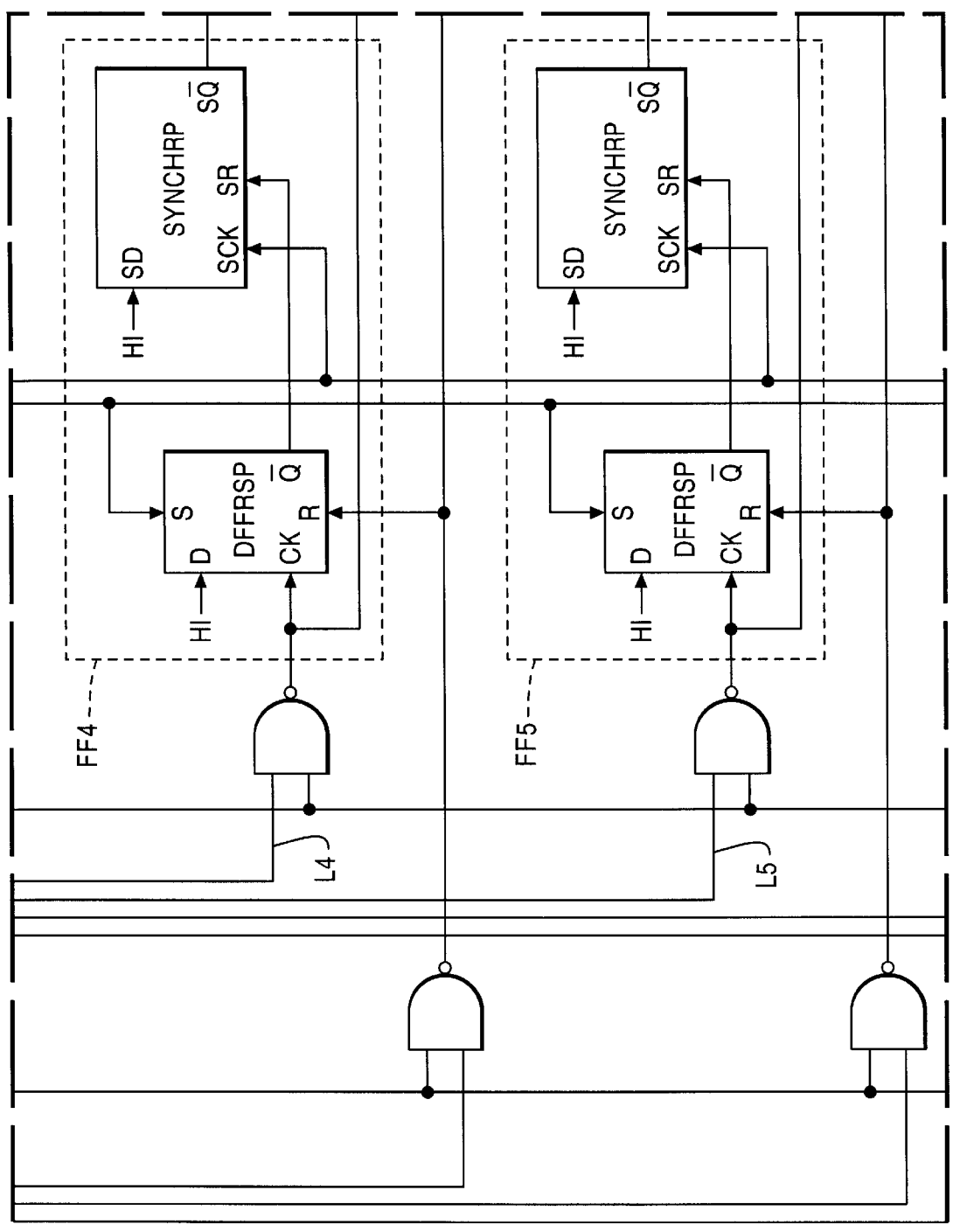
Figure 20G:
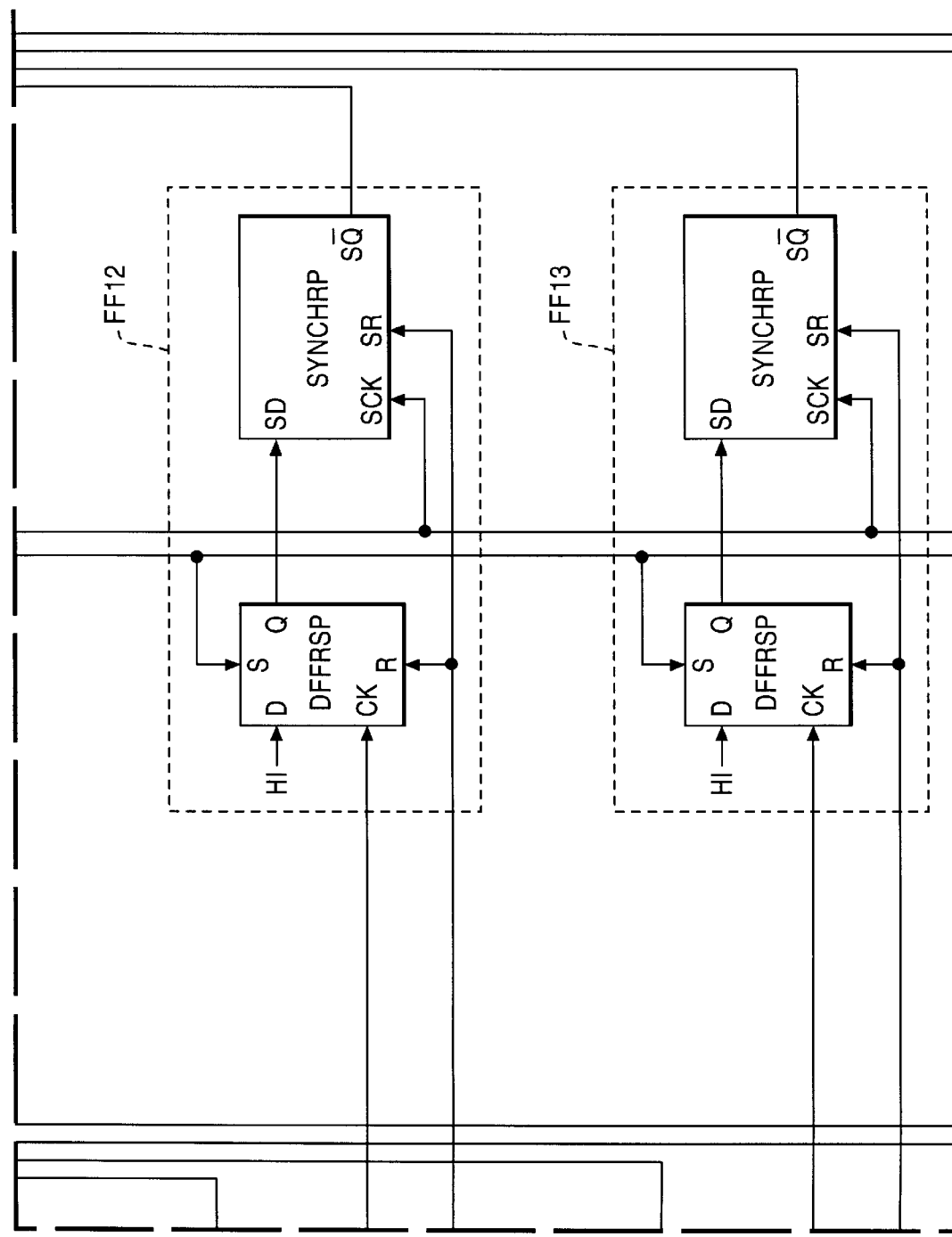
Figure 20H:
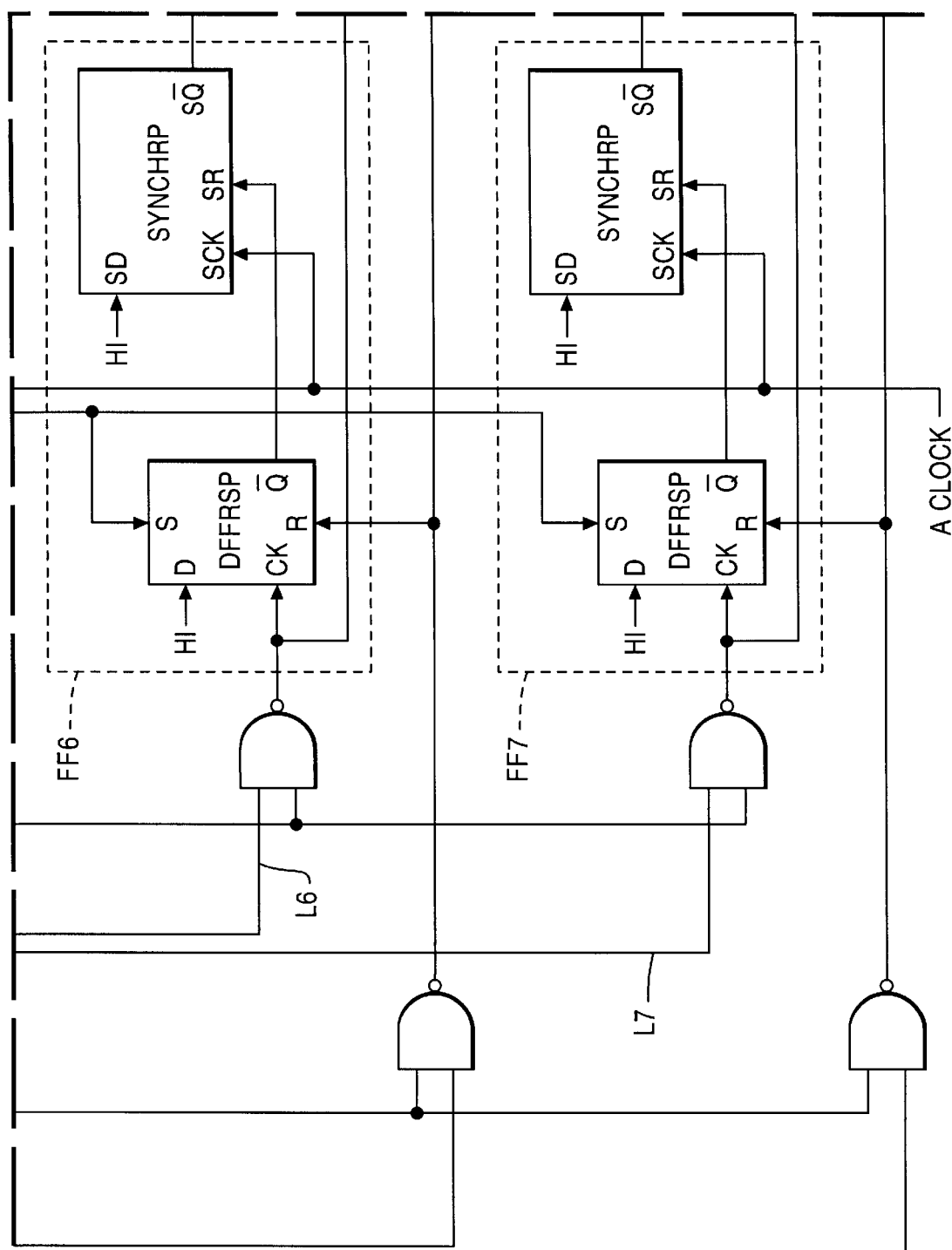
Figure 20I:
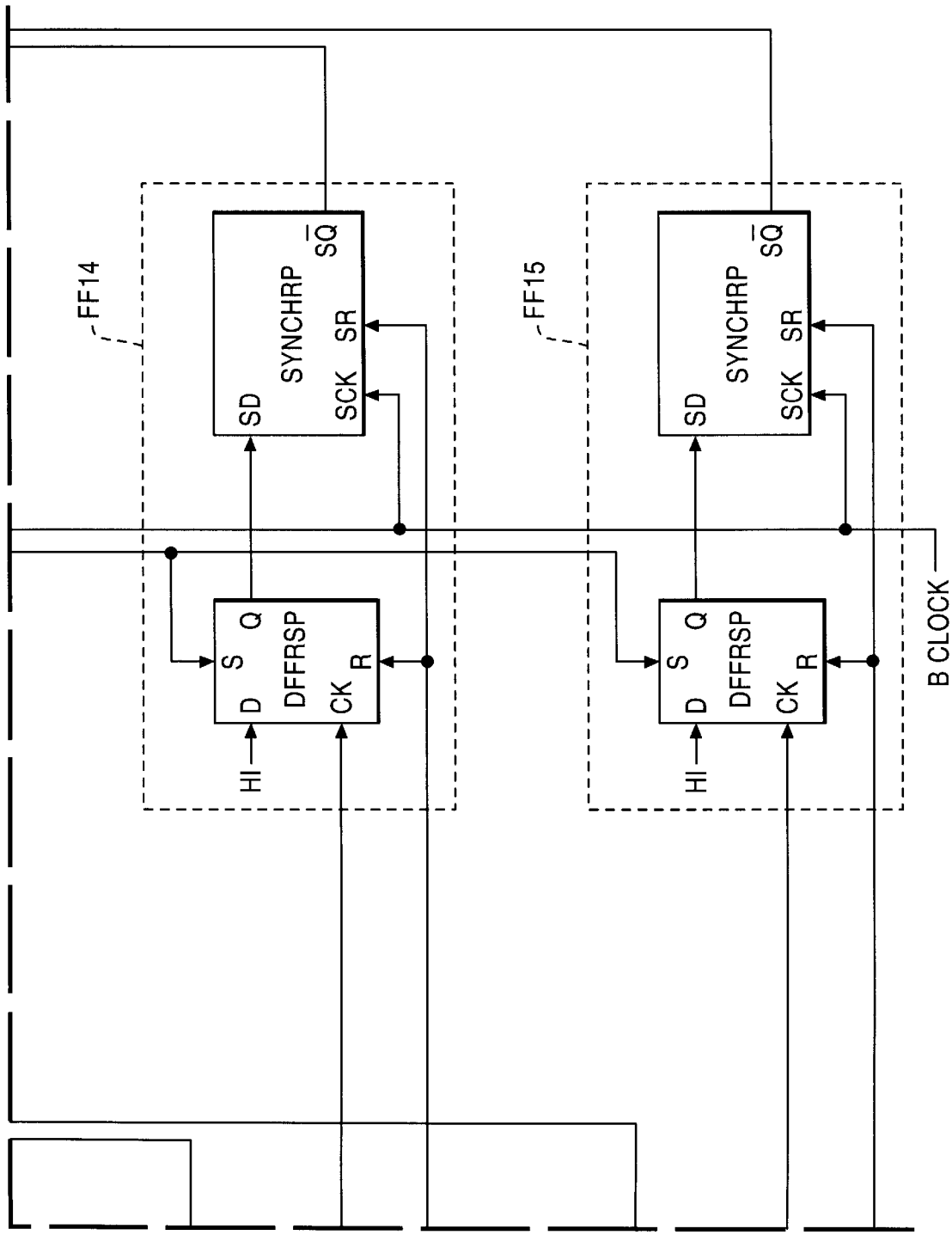

FIG. 20 is an overview of one form of the invention. An explanation of this Figure will be given stepwise, beginning with FIG. 2.

Generation of FIFO_EMPTY Signal

Figure 1:
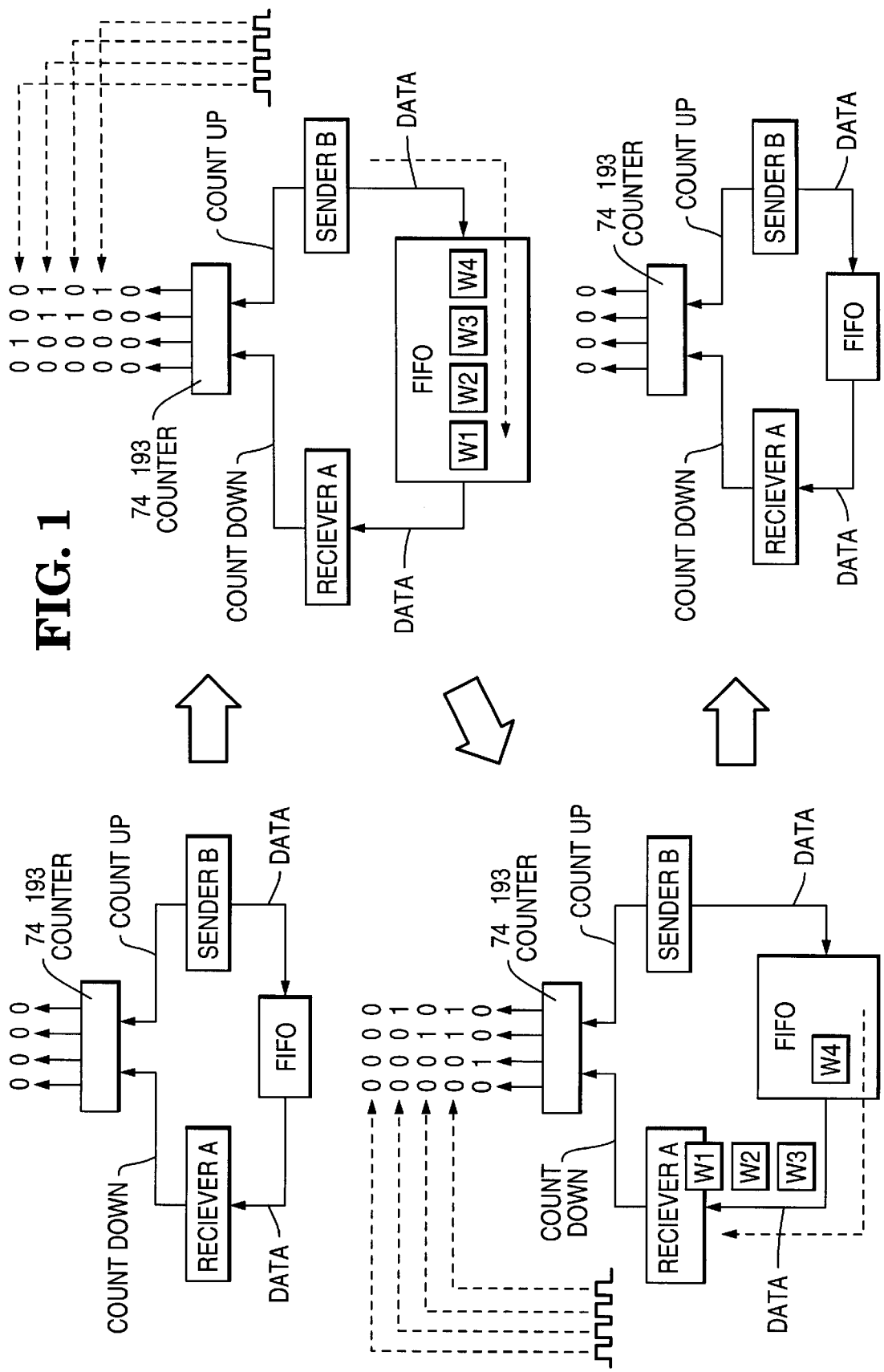
FIG. 1 illustrates how a counter can be used as a status indicator for a FIFO.
Figure 2:
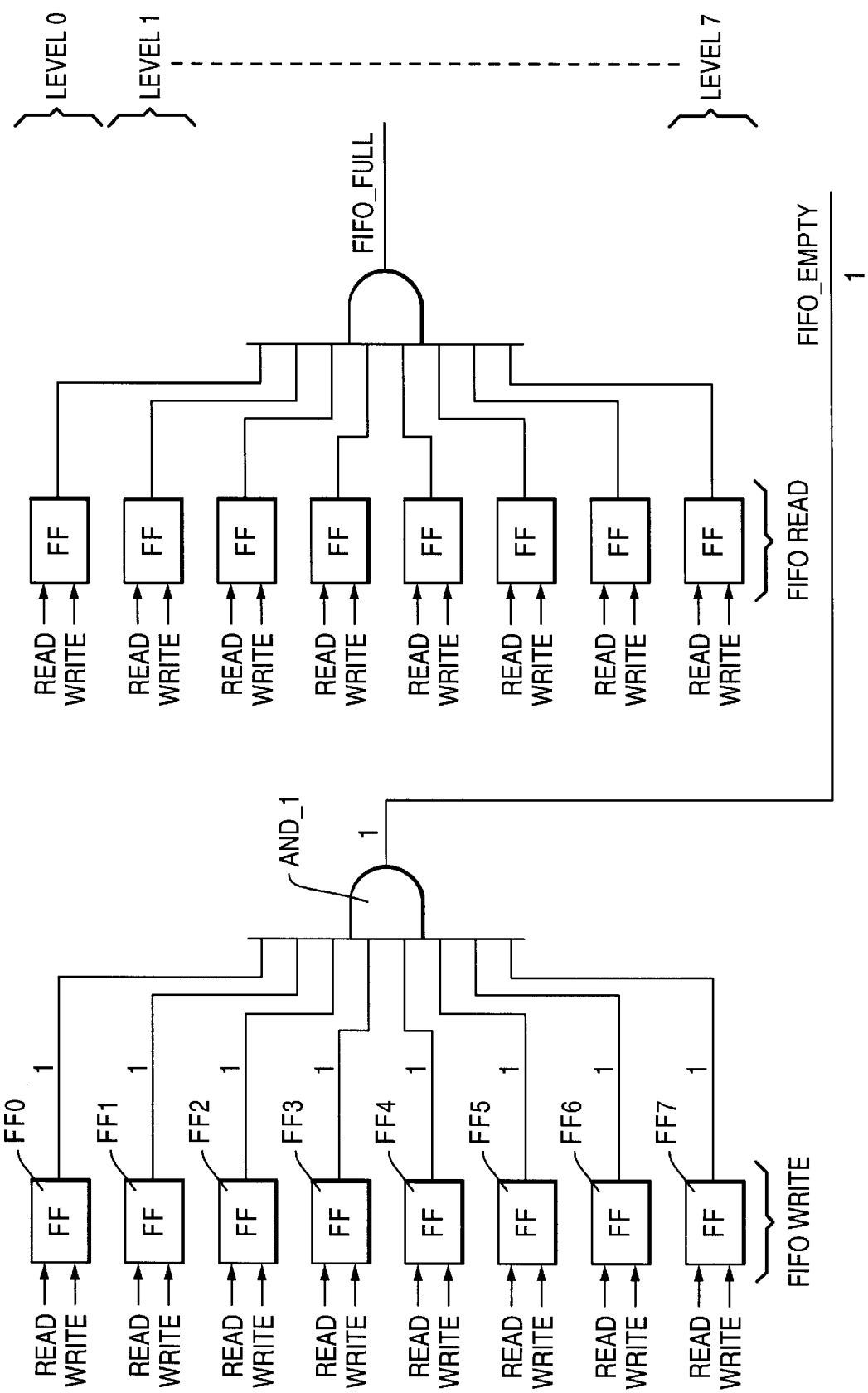
FIG. 2 illustrates the condition of half of the status registers immediately after initialization.

On the left side of FIG. 2 is a column; of eight memory cells, FF0–FF7. (There is also a column of FF's on the right, which will be discussed later.) Each cell FF corresponds to one level of an eight-level FIFO, as indicated by the symbols "LEVEL 0", etc., on the right. A "level" in a FIFO is a memory location, which contains a multi-bit data word.

These memory cells in FIG. 2 do not hold the actual data which is being transferred between two computers: the FIFO does that. Instead, they hold bits which indicate the status (empty or full) of each level of the FIFO. The cells FF can be called "FIFO status cells."

It is important to recognize that a given level in the FIFO need not be literally empty in order to have the status of empty. For example, after a receiver (e.g., computer A) reads a level, the level is considered empty, even though the reading operation may not have destroyed the data within the level, and the data remains intact in the level. Perhaps a better term would be "already read," but "empty" is the term used in the art.

On initialization of a data transfer, prior to any data being loaded into the FIFO, all status cells are triggered into a "1" state, as indicated in FIG. 2. All memory cells are ANDED together by the AND gate AND_1. Presently, AND_1 produces a "1" output on the FIFO_EMPTY line, indicating that the FIFO is empty.

This FIFO_EMPTY signal is used by the receiver. When the receiver detects a FIFO_EMPTY signal, the receiver refrains from reading data from the FIFO.

Figure 3:
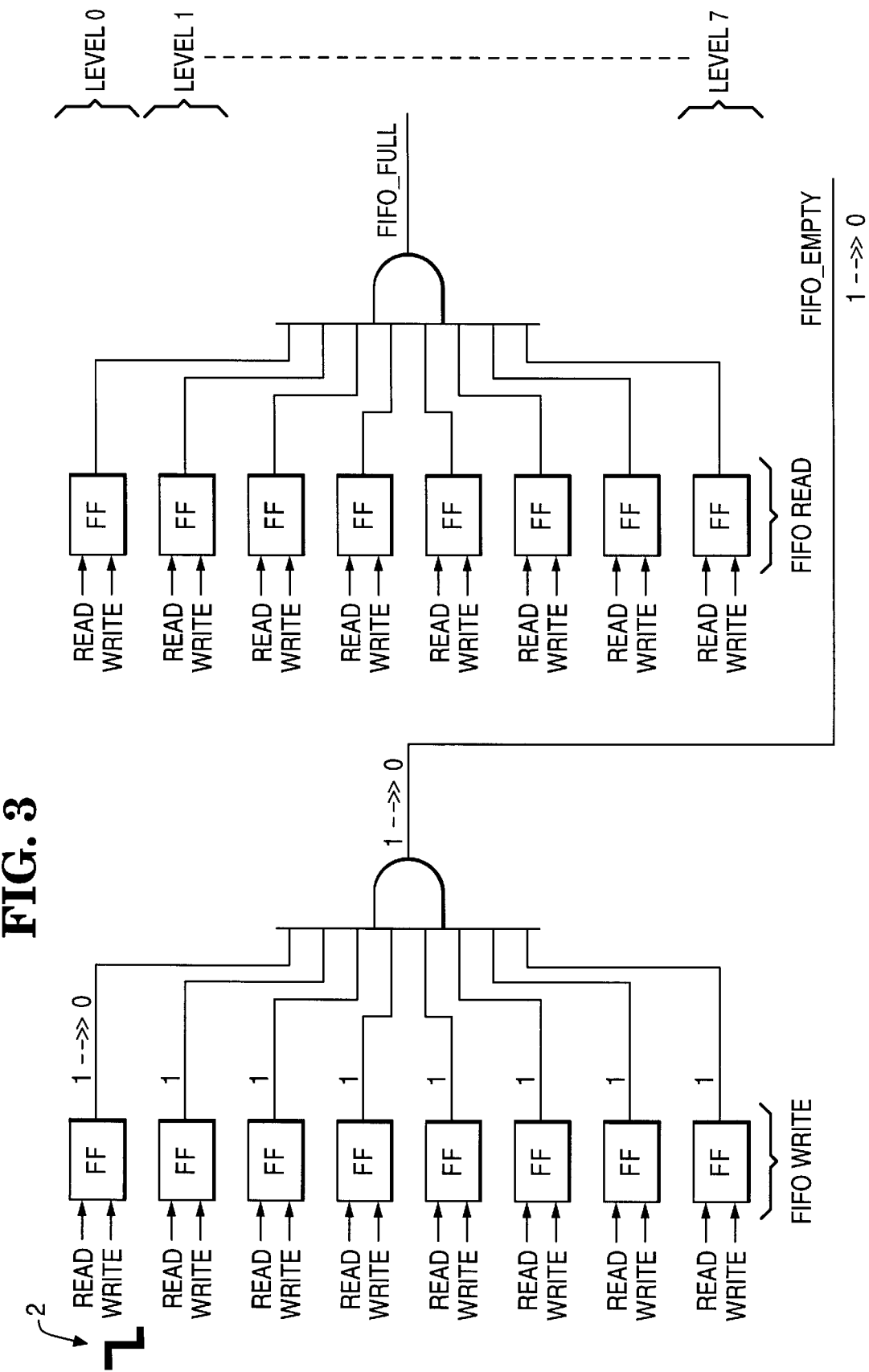
FIGS. 3–5 illustrate how half of the status registers respond to eight write operations.

If the sender loads a data word into the first level, level 0, of the FIFO (in the preferred embodiment, the words are 32 bits wide), the sender pulls a WRITE line low, as indicated by the HI-to-LOW transition symbol 2 in FIG. 3. This toggles status cell FF0, which corresponds to LEVEL 0, causing FF0 to produce an output of "0", as indicated. The FIFO_EMPTY signal is now pulled to "0", as indicated. The FIFO_EMPTY signal no longer indicates that the FIFO is empty, because the FIFO contains one data word.

The receiver, on detecting this "0"signal, learns that the FIFO contains data, and reads the data. However, at present, assume that no read operation occurs, and that the sender simply continues to load data words into the FIFO.

Figure 4:
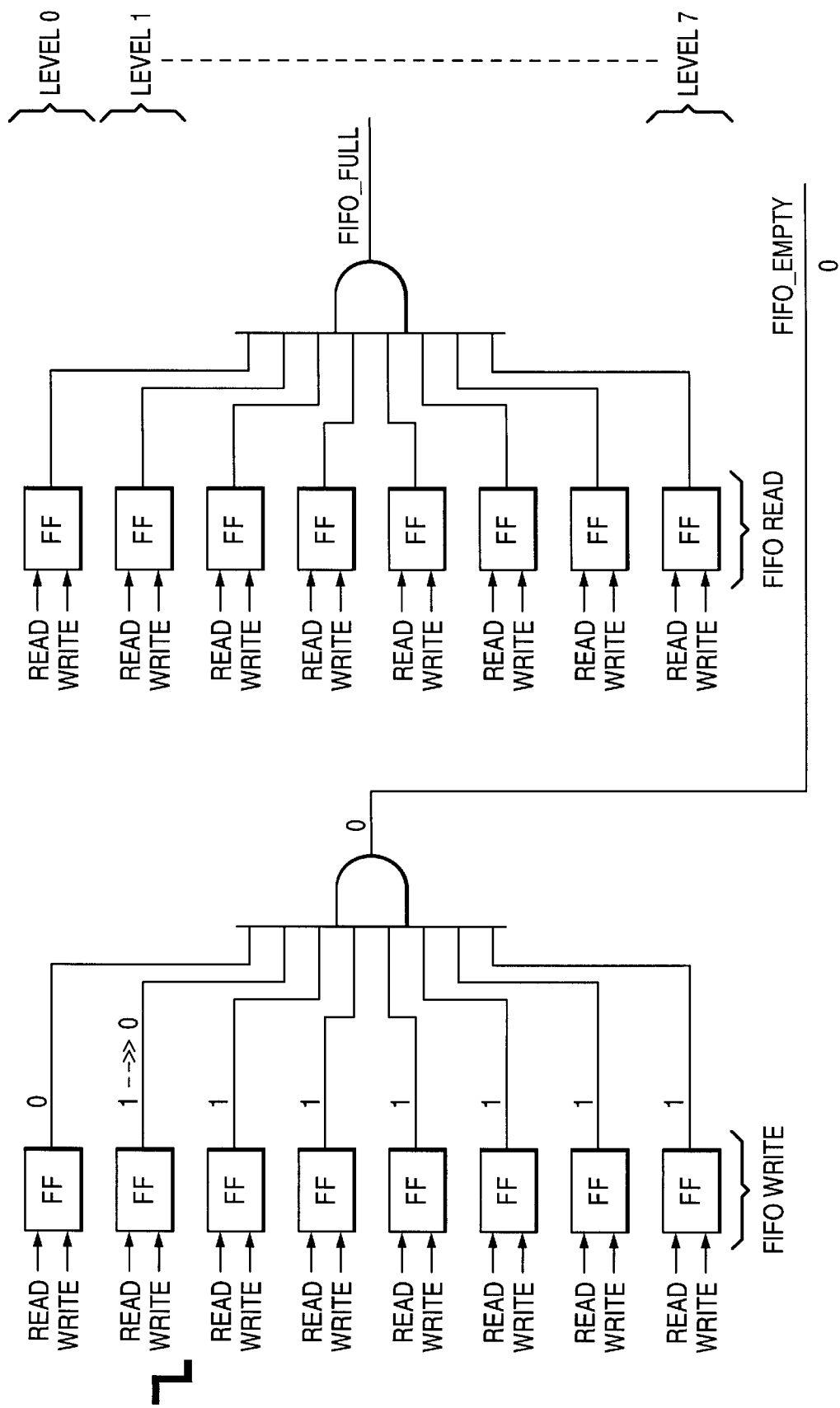

When the sender loads the second data word into level 1 of the FIFO, the sender applies a WRITE signal to the status cell for LEVEL 1, FF1, as indicated in FIG. 4. The status cell FF1 toggles to an output of "0", as indicated. However, the FIFO_EMPTY signal remains at "0", as indicated, consistent with the fact that the loading of level 1 did not change the non-empty status of the FIFO: LEVEL 0 already contained data.

As the sender loads each of the first seven levels of the FIFO, it applies a WRITE to the status cell FF for each level. Finally, the sender loads the eighth level, and issues a WRITE signal to the status cell for LEVEL 7, as indicated in FIG. 5.

Figure 5:
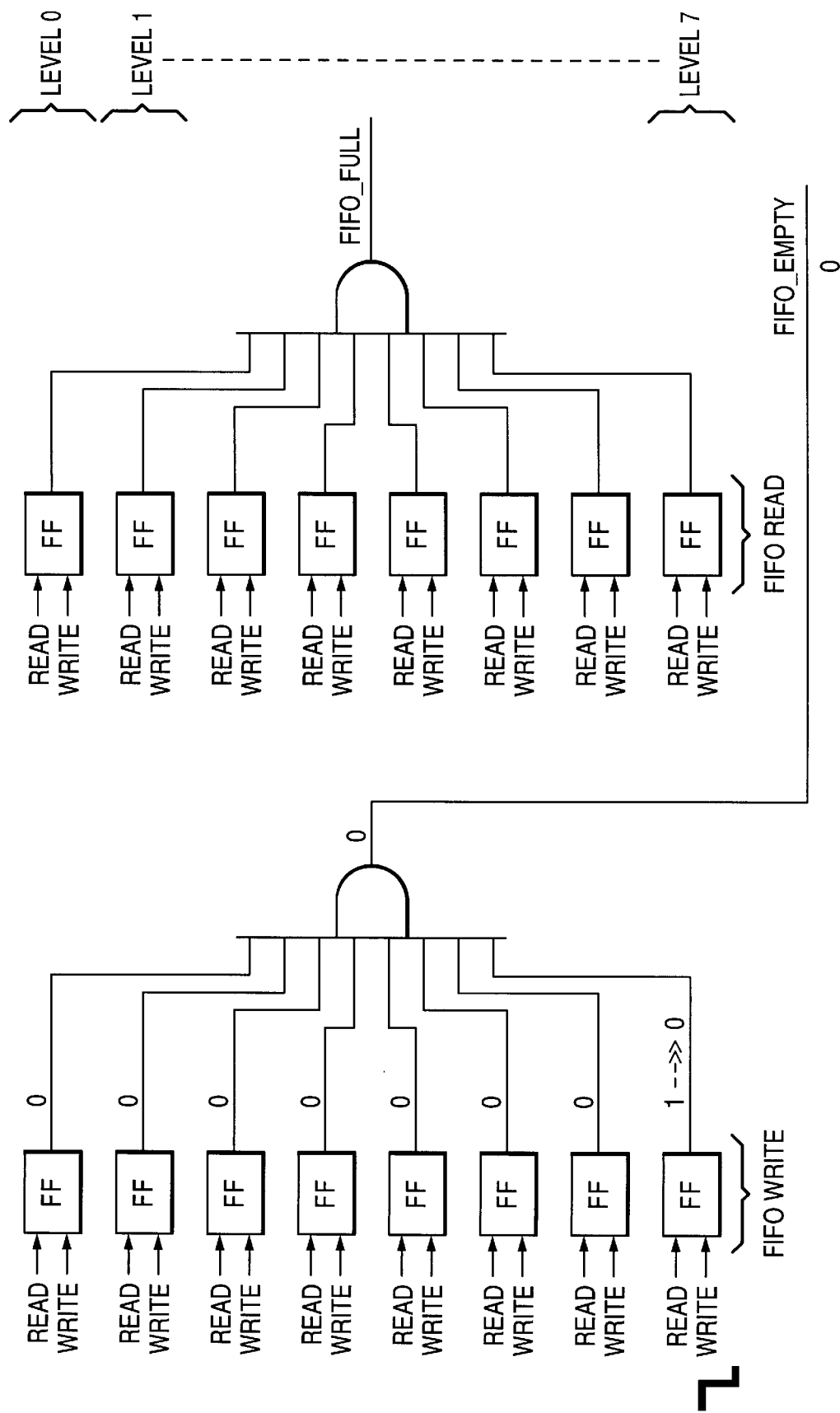

Now, after all eight levels have been loaded with data, all status cells FF in FIG. 5 produce "0" signals. The FIFO_EMPTY signal is "0".

Figure 6:
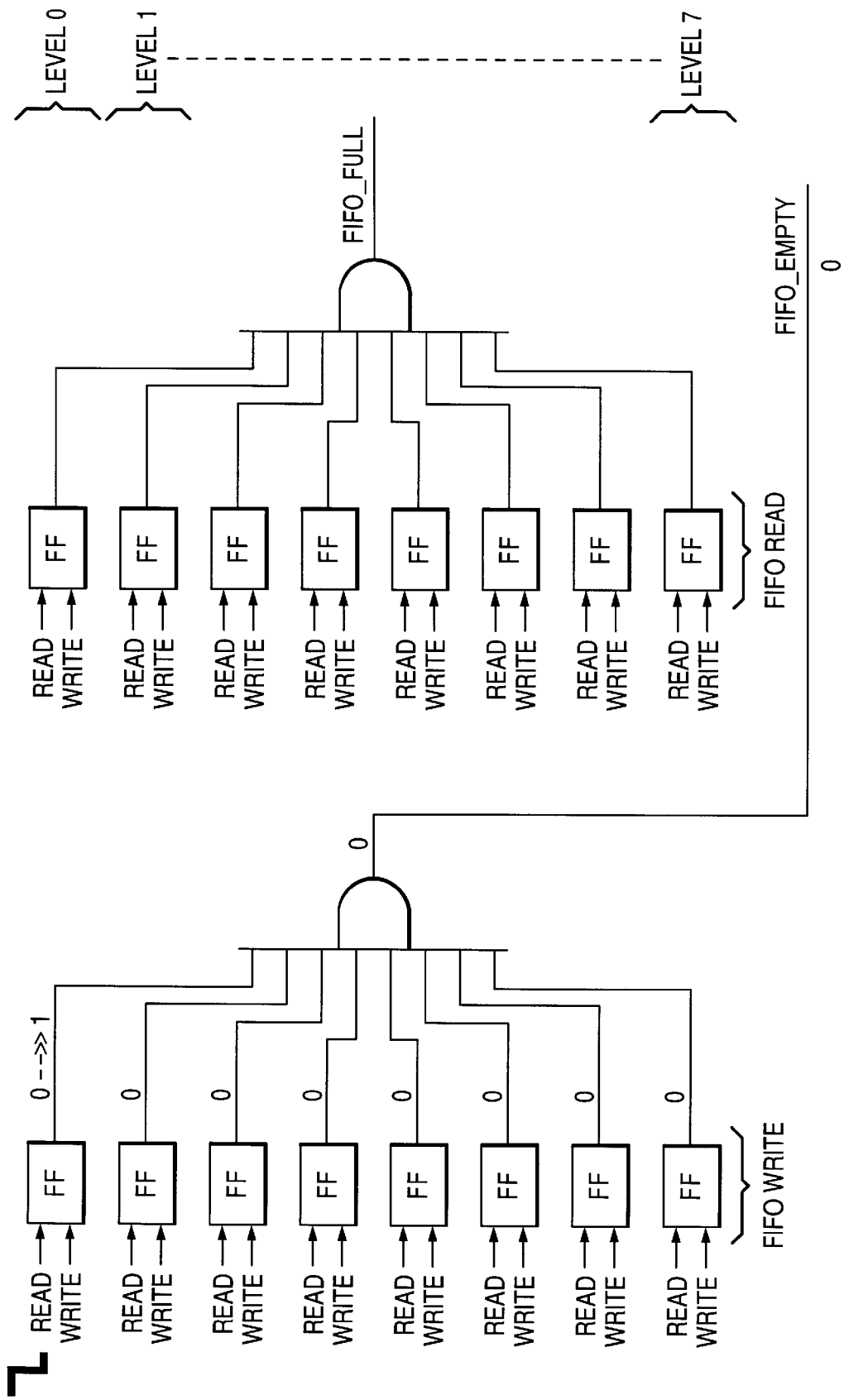
FIGS. 6–8 illustrate how half of the status registers respond to eight read operations, which follow the write operations of FIGS. 3–5.

Now assume that the receiver begins to read the data held in the FIFO. When the receiver reads the data word in level 0, it applies a READ signal, in FIG. 6, to the status cell for LEVEL 0. This READ signal toggles the status cell FF0 from "0" to "1", as indicated. However, the FIFO_EMPTY signal remains unchanged (at "0"), because the FIFO is not yet empty.

Figure 7:
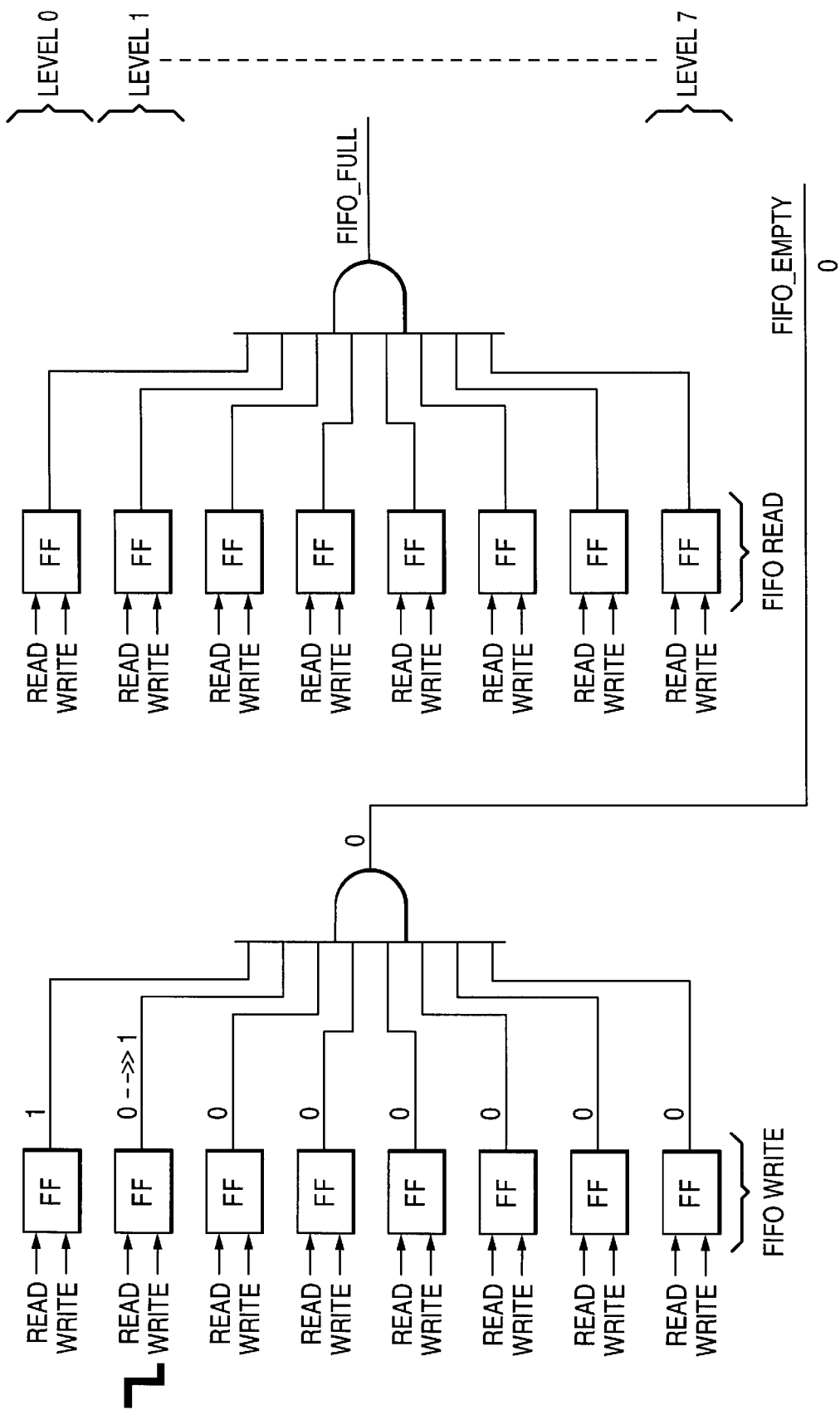

Next, the receiver reads the data in level 1, and applies a READ signal to that level's status cell, FF1, as in FIG. 7. That status cell toggles from "0" to "1". The FIFO_EMPTY signal remains unchanged.

Figure 8:
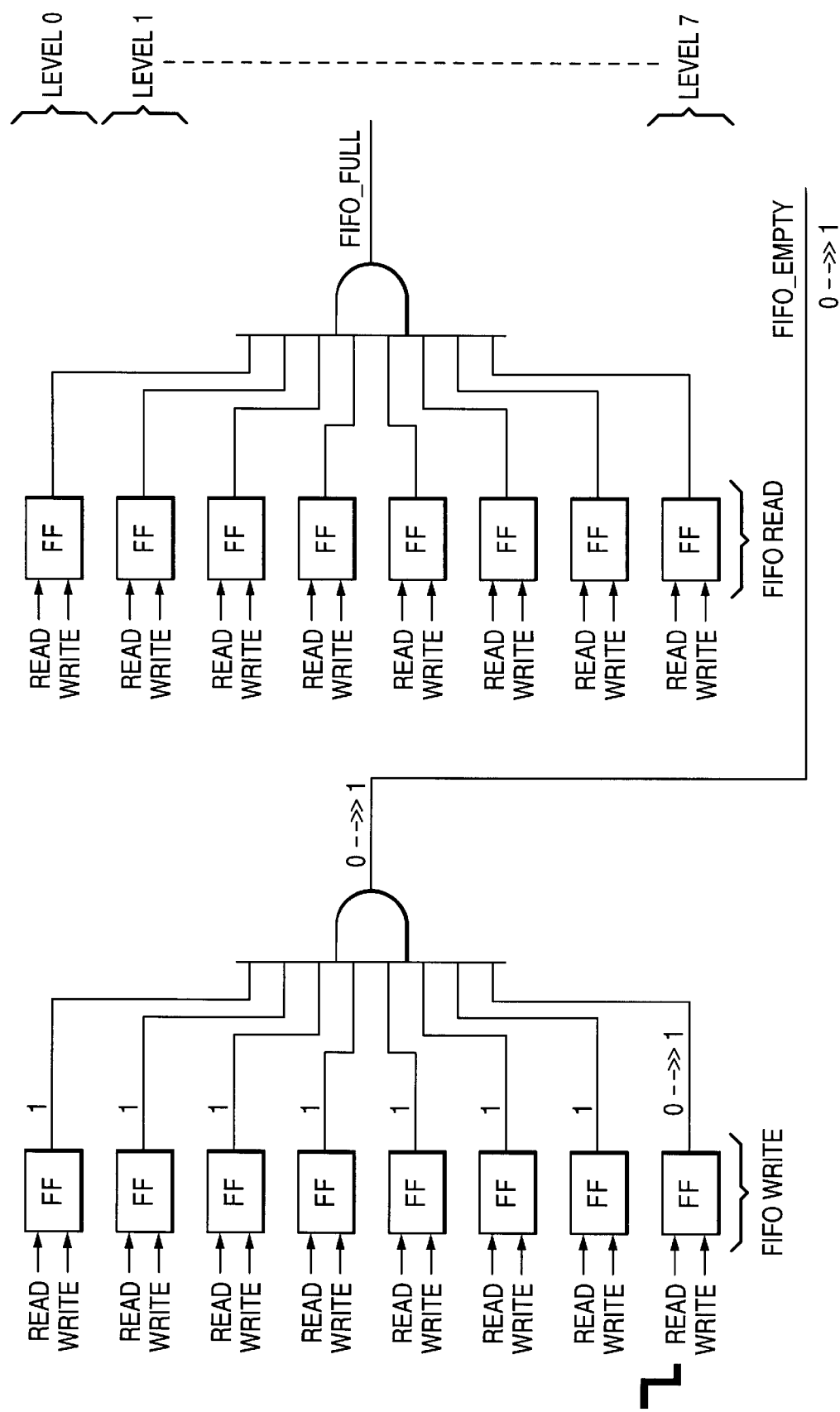

The receiver continues, reading each level. When the receiver reaches the last level, level 7, it applies a READ to the status cell for that level, FF7, as in FIG. 8. That status cell toggles from "0" to "1". Now, AND_1 receives eight inputs of "1", and its output toggles from "0" to "1". The FIFO_EMPTY signal toggles from "0" to "1", as indicated.

The FIFO_EMPTY signal of "1" indicates that the FIFO is empty. The receiver monitors the FIFO_EMPTY signal, and discontinues reading the FIFO in response to the FIFO_EMPTY signal of "1".

Therefore, the invention tracks reading of the FIFO by the receiver, and produces a FIFO_EMPTY signal after all levels of the FIFO have been read.

Generation of FIFO_FULL Signal

Figure 9:
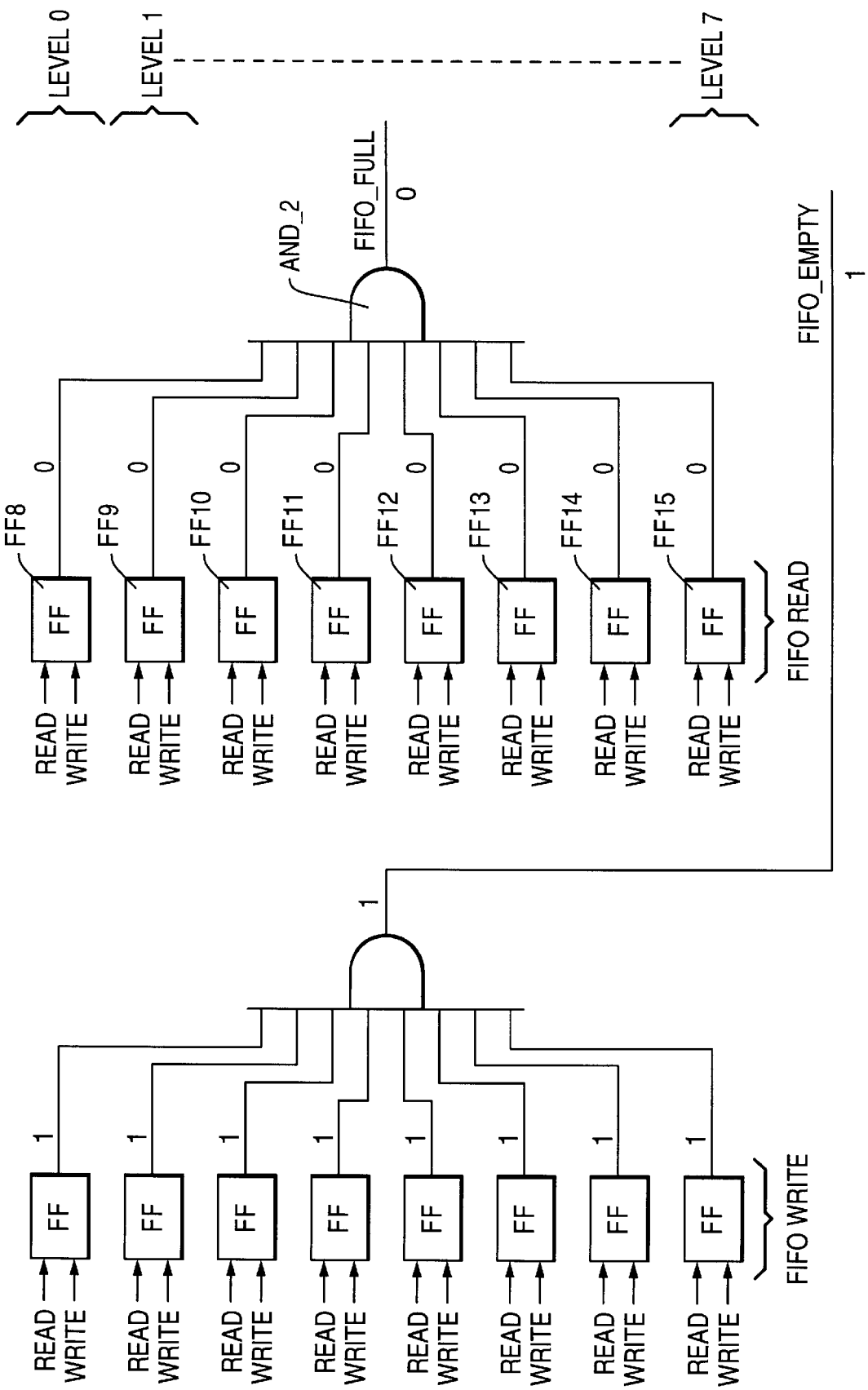
FIG. 9 illustrates the condition of all of the status registers immediately after initialization.

This discussion will now explain production of the FIFO_FULL signal. FIG. 9 shows a second column of eight status cells, FF8–FF15. Each corresponds to one level of the FIFO. (Thus, two status cells correspond to each level of the FIFO: FF0 and FF8 correspond to level 0; FF1 and FF9 correspond to level 1, etc.) Upon initialization, all status cells FF8–FF15 are driven into a state of "0" output, as indicated.

All of these outputs (presently of "0" value) are ANDED together by AND_2: AND_2 presently produces an output of "0". The output of AND_2 is termed a FIFO_FULL signal. When this signal is "1", the FIFO is considered full. The sender monitors this signal, and when the signal indicates that the FIFO is full, the sender refrains from writing further data into the FIFO.

When the sender writes a data word into the first level of the FIFO, level 0, it applies a WRITE signal to FF0 in FIG. 3, as discussed above. This WRITE signal is repeated at the WRITE input of FF0 in FIG. 10.

Figure 10:
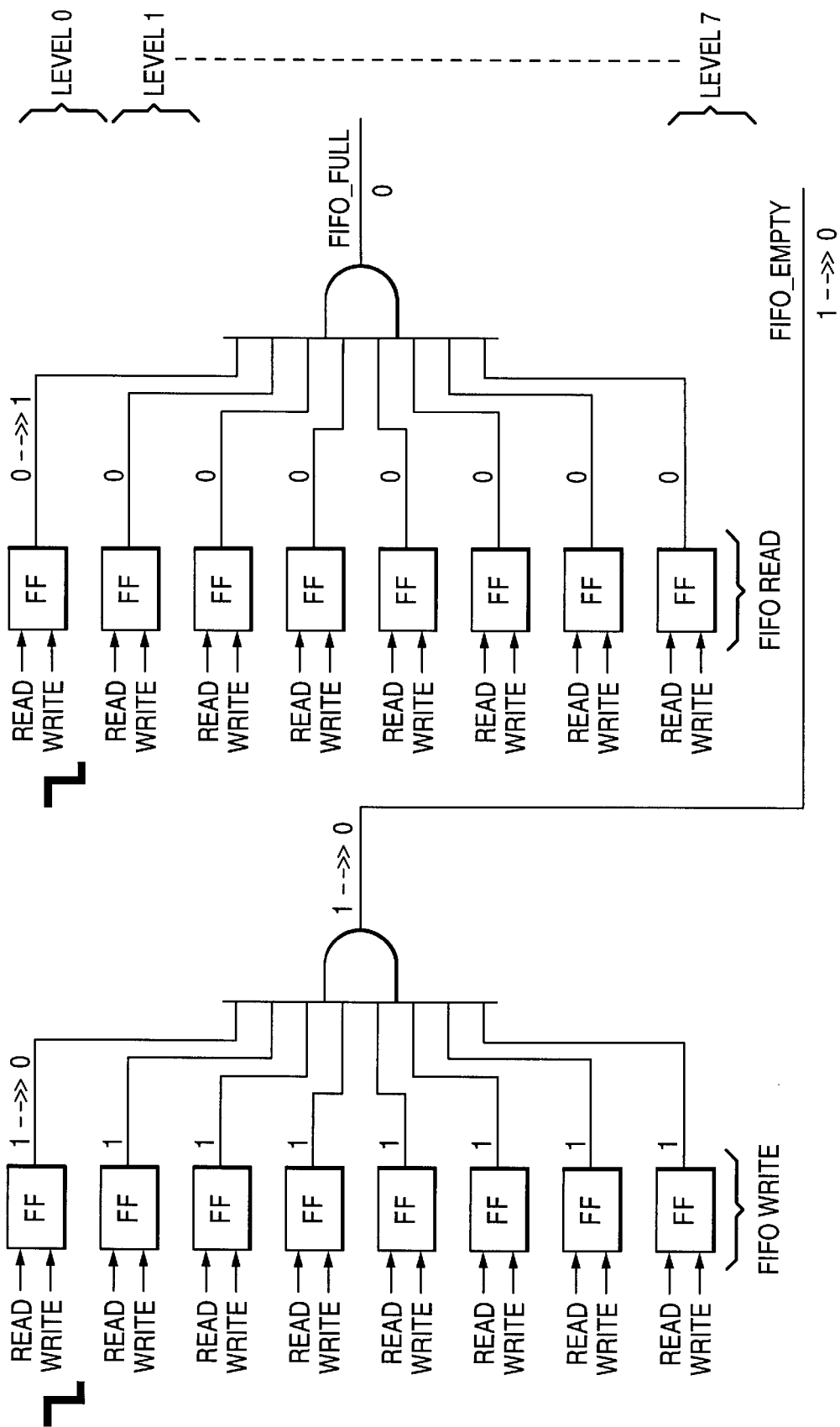
FIGS. 10–12 illustrate how all of the status registers respond to eight write operations.
Figure 11:
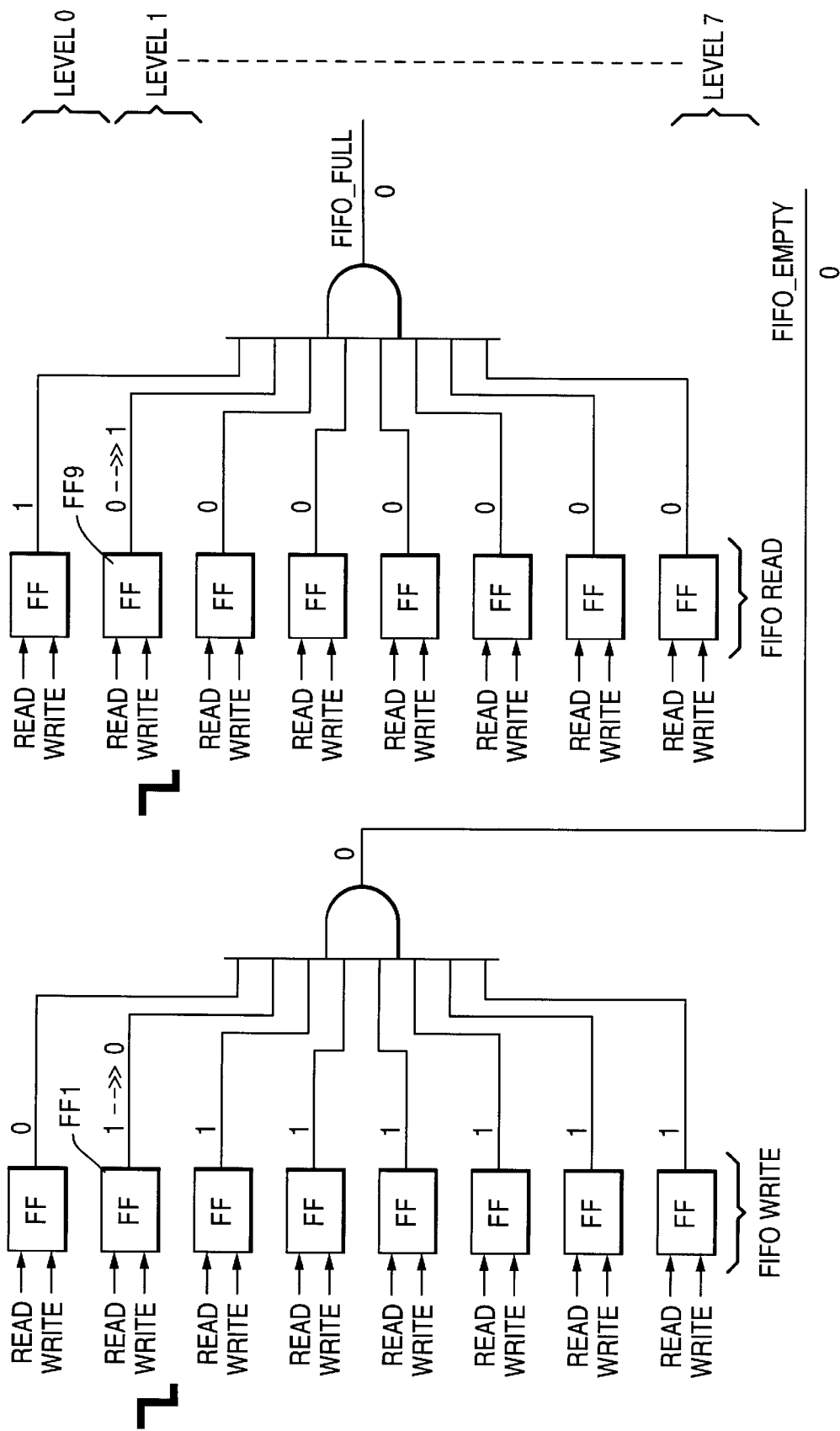

In addition, the same WRITE signal is applied to FF8 in FIG. 10, as indicated. Both FF0 and FF8 toggle, but in opposite directions. FF0 toggles from "1"to "0", while FF8 toggles from "0" to "1".

The FIFO_FULL signal does not change, because the FIFO is not, in fact, full. However, as discussed earlier, the FIFO_EMPTY signal does change at this time, because the previously empty FIFO has just been loaded with a data word.

When the sender writes a second data word into the FIFO, into level 1, it applies a WRITE signal to both cells FF1 and FF9. Both cells toggle, as indicated. FIFO_EMPTY and FIFO_FULL remain unchanged, both at "0".

Figure 12:
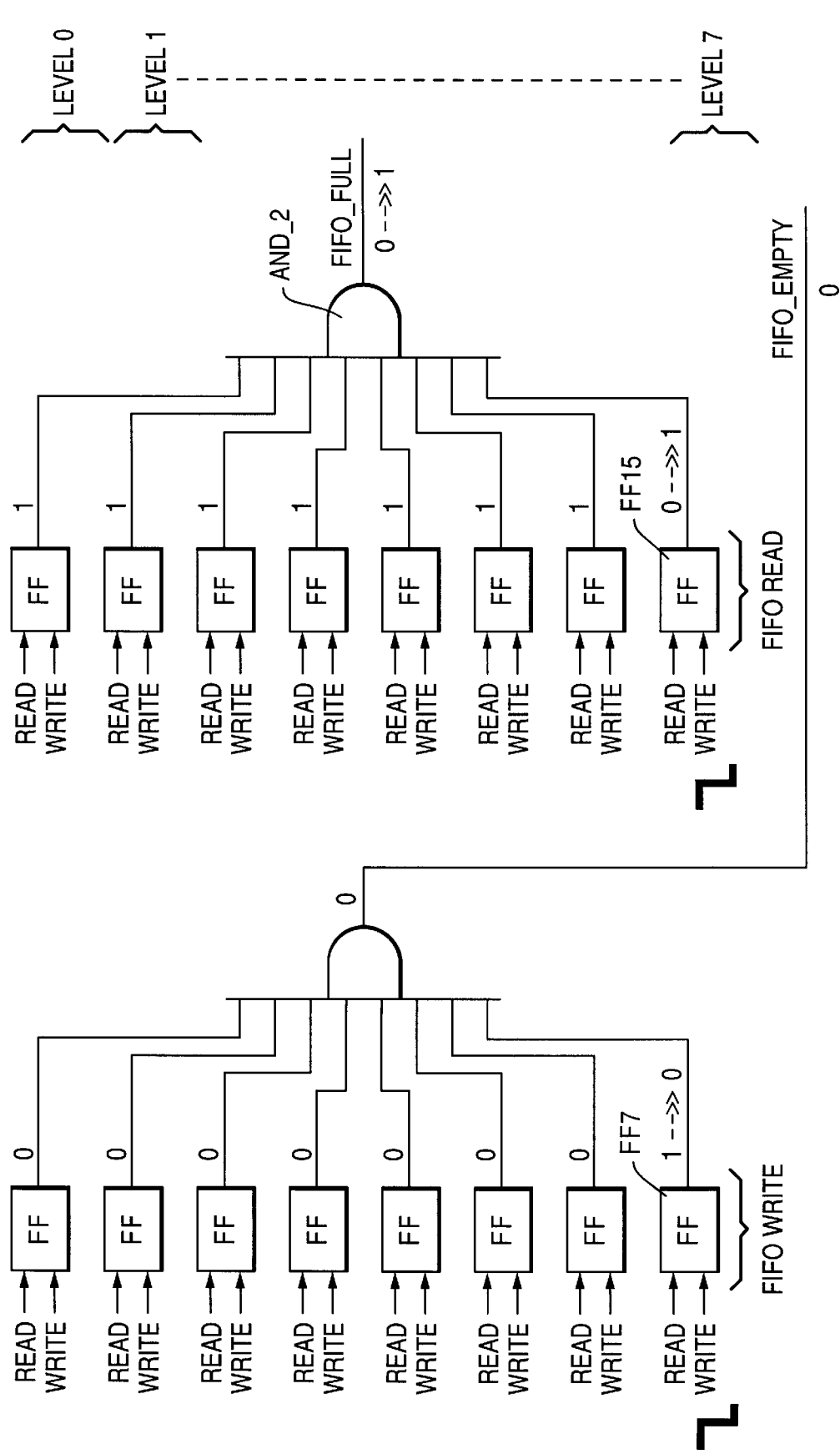

The sender continues writing data words into the FIFO, and applying a WRITE signal to each pair of FF's, terminating with the WRITE signal indicated in FIG. 12, which is applied to FF7 and FF15. Now the FIFO is full. Both these FF's toggle. However, the toggling of FF15 causes AND__2 to receive eight inputs of "1," causing AND__2 to toggle. Now AND__2 produces a FIFO__FULL signal, of value "1".

The FIFO__FULL signal indicates that all eight levels in the FIFO contain data. The sender monitors this signal, and now refrains from writing further data into the FIFO.

Read Operations

The previous discussion considered writing operations. Read operations will now be considered.

Figure 13:
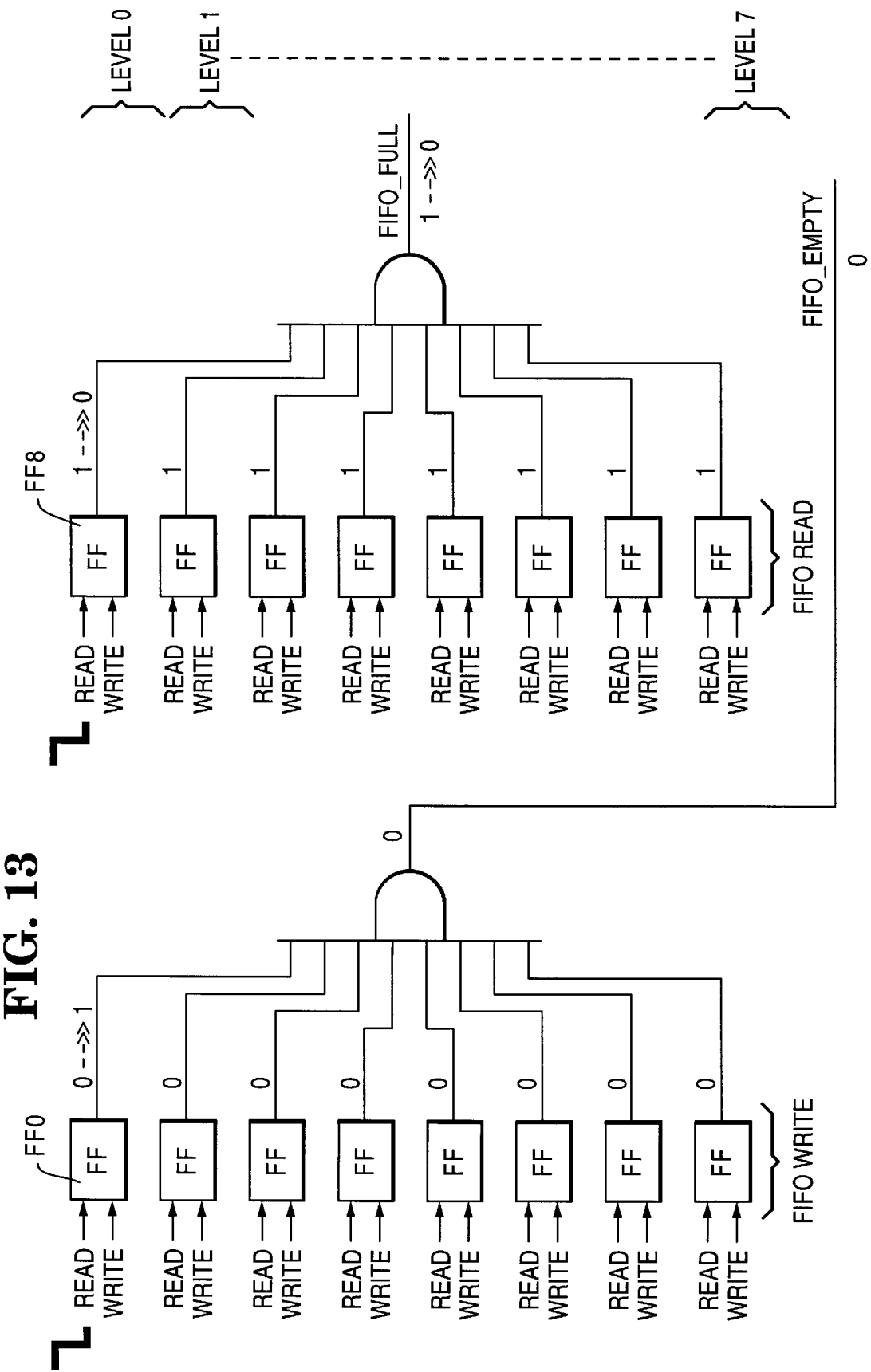
FIGS. 13–15 illustrate how all of the status registers respond to eight read operations which follow the write operations of FIGS. 10–12.

Assume that the FIFO is full. At this time, prior to the read operation, as shown in FIG. 13, the left column of FF's (FF0–FF7) all hold data of "0," indicating that their corresponding levels are full. Similarly, the right column of FF's (FF8–FF15) all hold data of "1," also indicating that their corresponding levels are full.

When the receiver reads level 0 of the FIFO, the receiver applies a READ signal to the READ lines of both FF0 and FF8, as indicated. The output of FF0 changes from "0" to "1" while that of FF8 changes from "1" to "0". The FIFO__FULL signal changes from "1" to "0", indicating that the FIFO is now considered to be not full. The sender may, if it wishes, load another data word into the FIFO.

Figure 14:
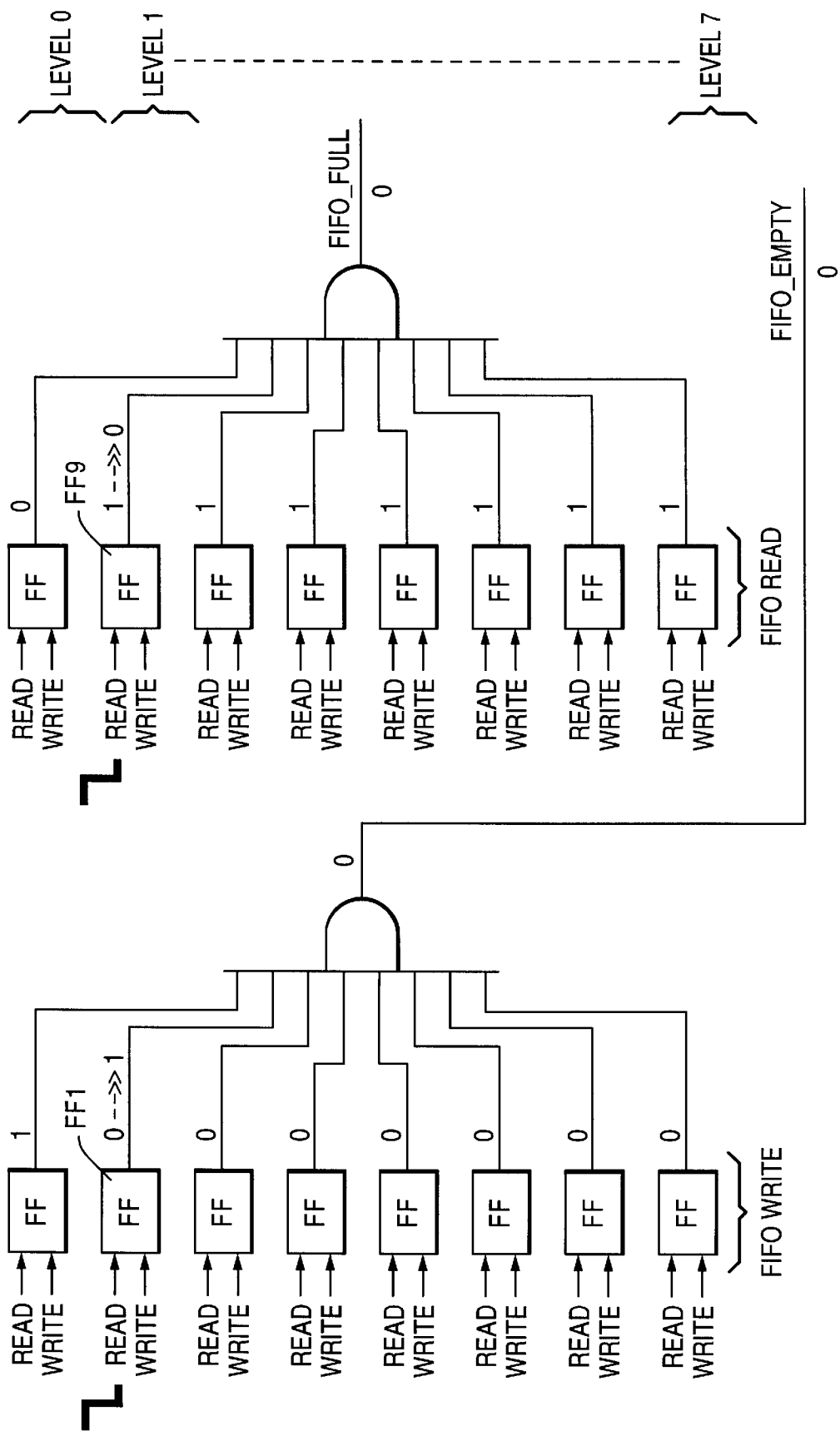

In FIG. 14, the receiver continues to read the FIFO. It reads level 1, and applies a READ signal to the READ input of both FF's for LEVEL__1, namely, FF1 and FF9.

Figure 15:
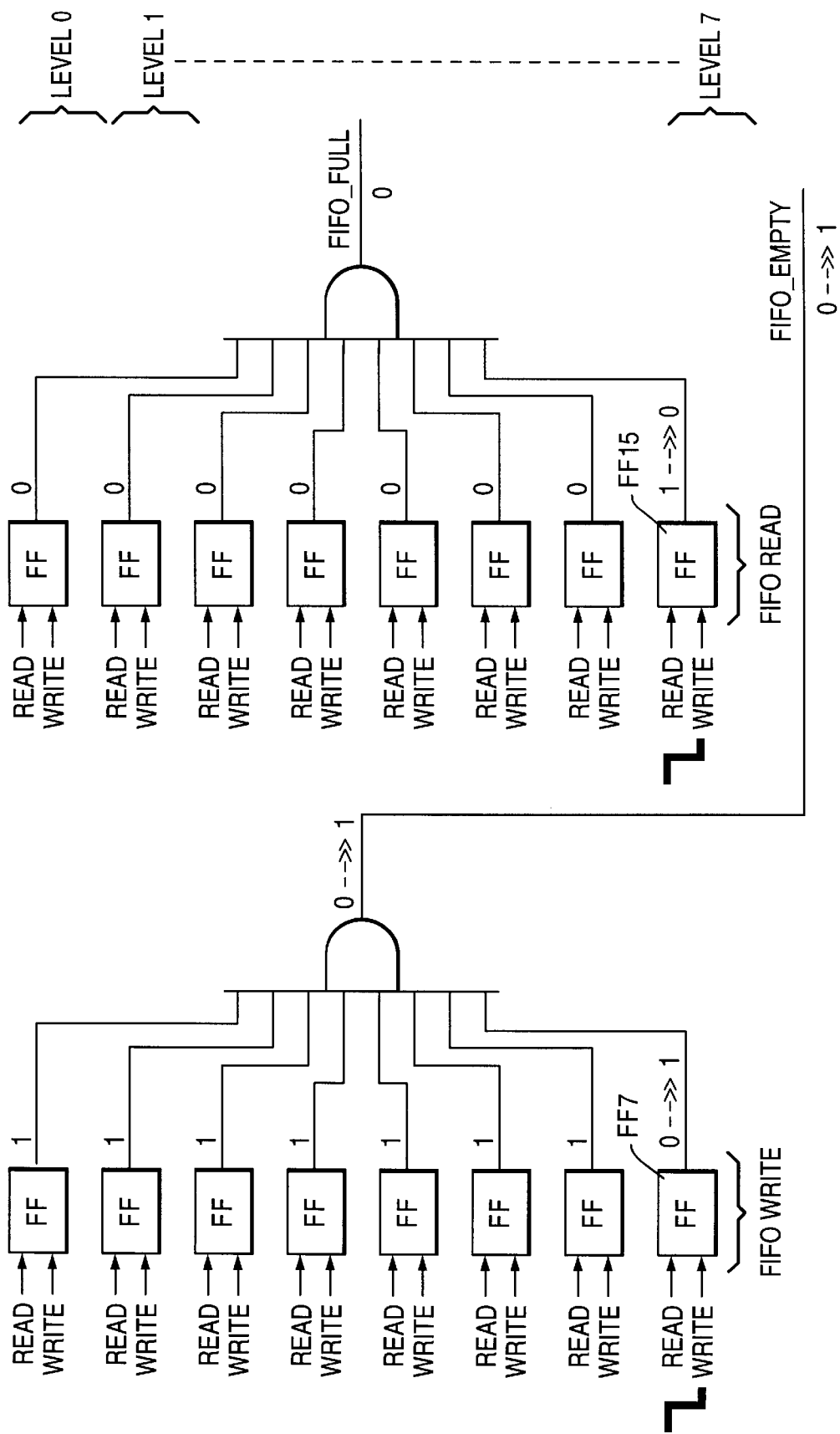

The receiver continues to read the remaining levels, applying a READ signal to the two FF's corresponding to each level. The read process terminates with reading level 7, at which time the receiver applies a READ signal to FF7 and FF15, as in FIG. 15. After this last read operation, the FIFO__EMPTY flag now reads "1". The FIFO is considered empty.

Partial WRITEs and Partial READs

The preceding discussion considered a sequence of write operations which fully loaded the FIFO, followed by a sequence of read operations which fully emptied the FIFO. This discussion will now consider partial loading and partial emptying of the FIFO.

Figure 16:
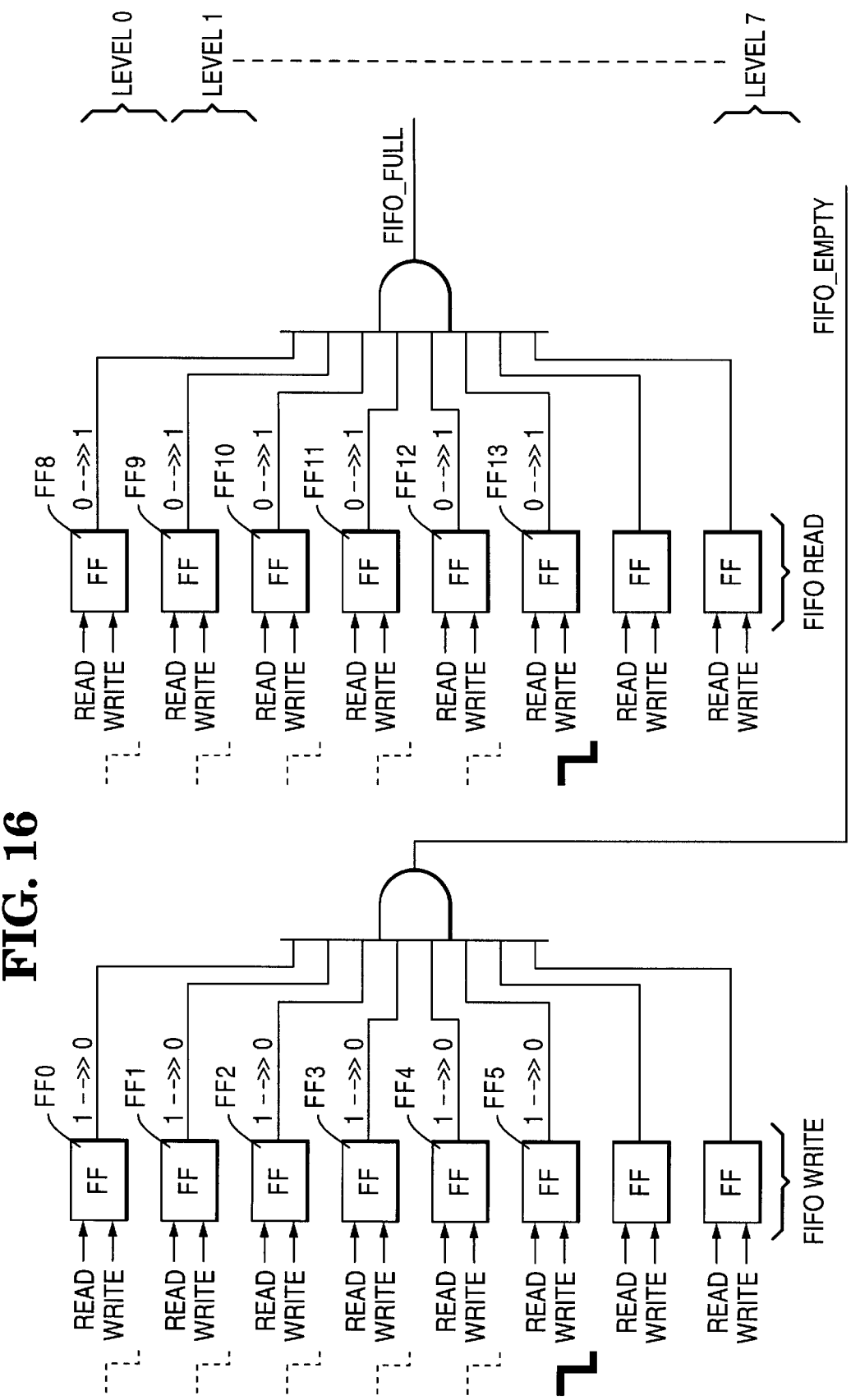
FIG. 16 illustrates how all the status registers respond to six write operations.
Figure 17:
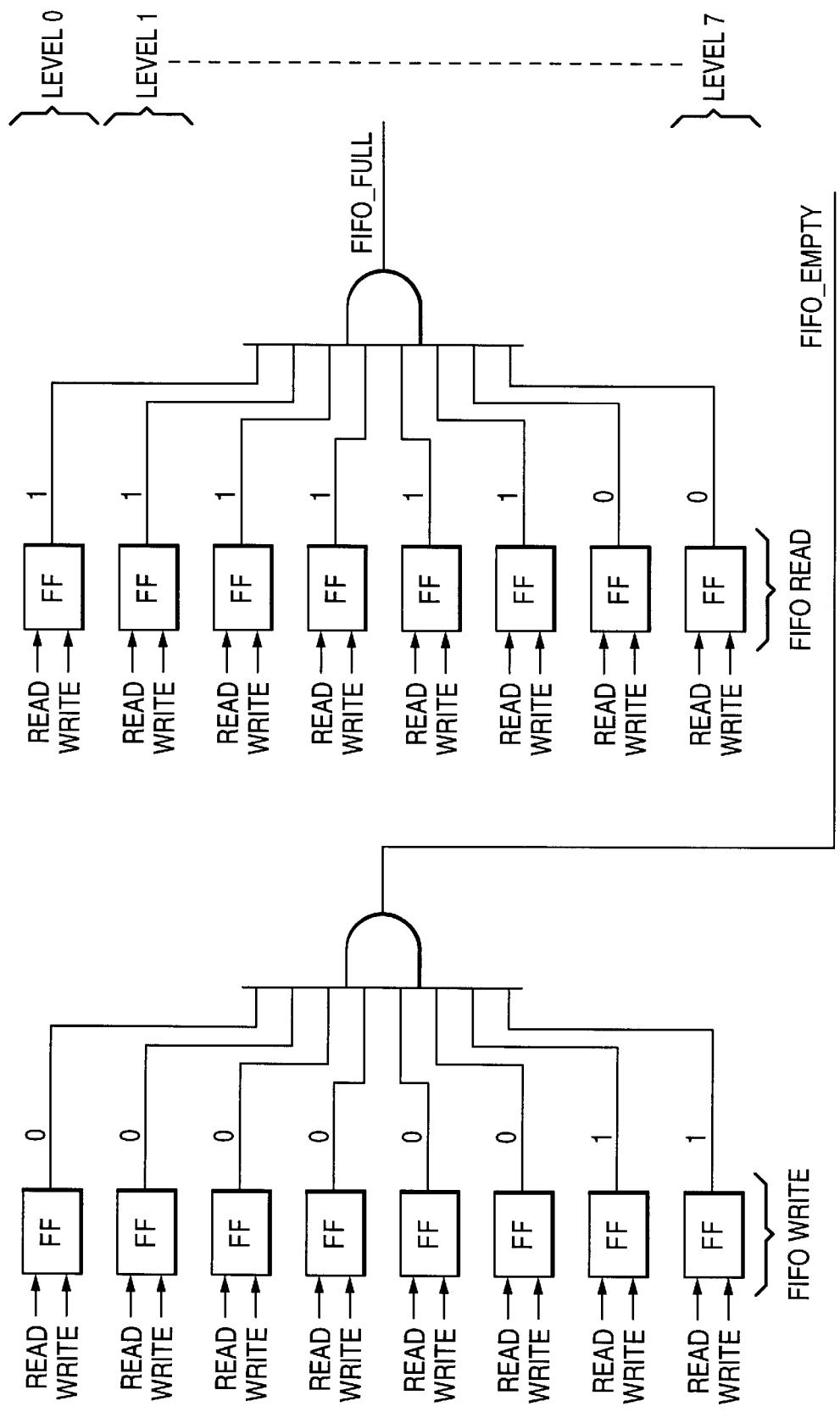
FIG. 17 illustrates the condition of the status registers following the write operations of FIG. 16.

In FIG. 16, the sender writes six data words to levels 0 through 5. That is, in sequence, the SENDER applies WRITE signals to FF0 through FF5, as indicated by the dashed WRITE signals, and the final, solid, WRITE signal. After the six write operations, the condition of the FF's is shown in FIG. 17.

Figure 18:
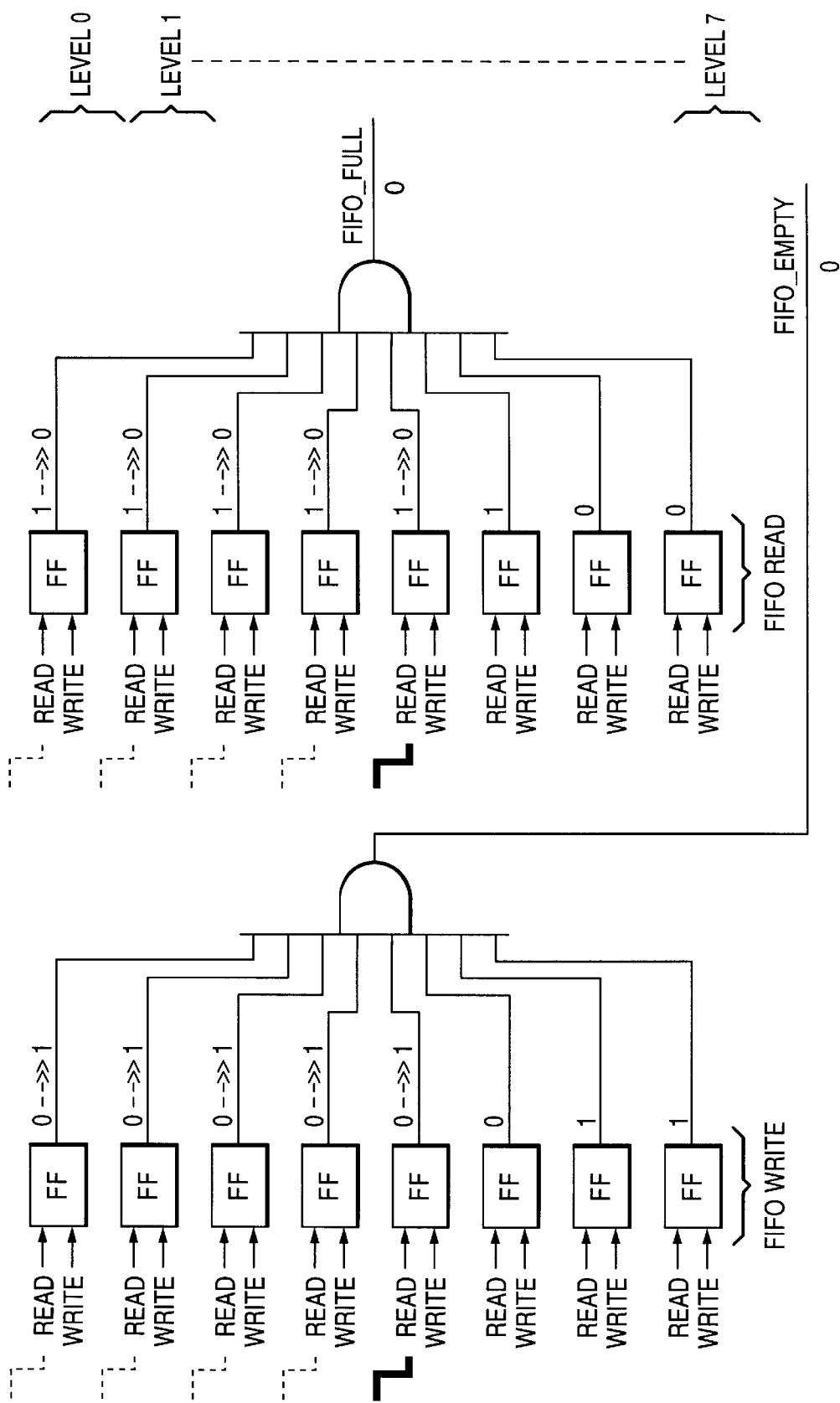
FIG. 18 illustrates how all of the status registers respond to five read operations, which immediately follow the six write operations of FIG. 16, with no intervening write operations.

Now, as an extreme example, assume that the receiver reads five of the data words before the sender can write the seventh word. That is, the receiver applies a READ signal to cells FF0 through FF4, as shown in FIG. 18. That is, after the read operation, The status cells corresponding to levels 0 through 4 indicate that these levels are empty.

The status cell corresponding to level 5 indicates that this level is full.

The status cell corresponding to levels 6 and 7 indicate that these levels are empty.

Figure 19:
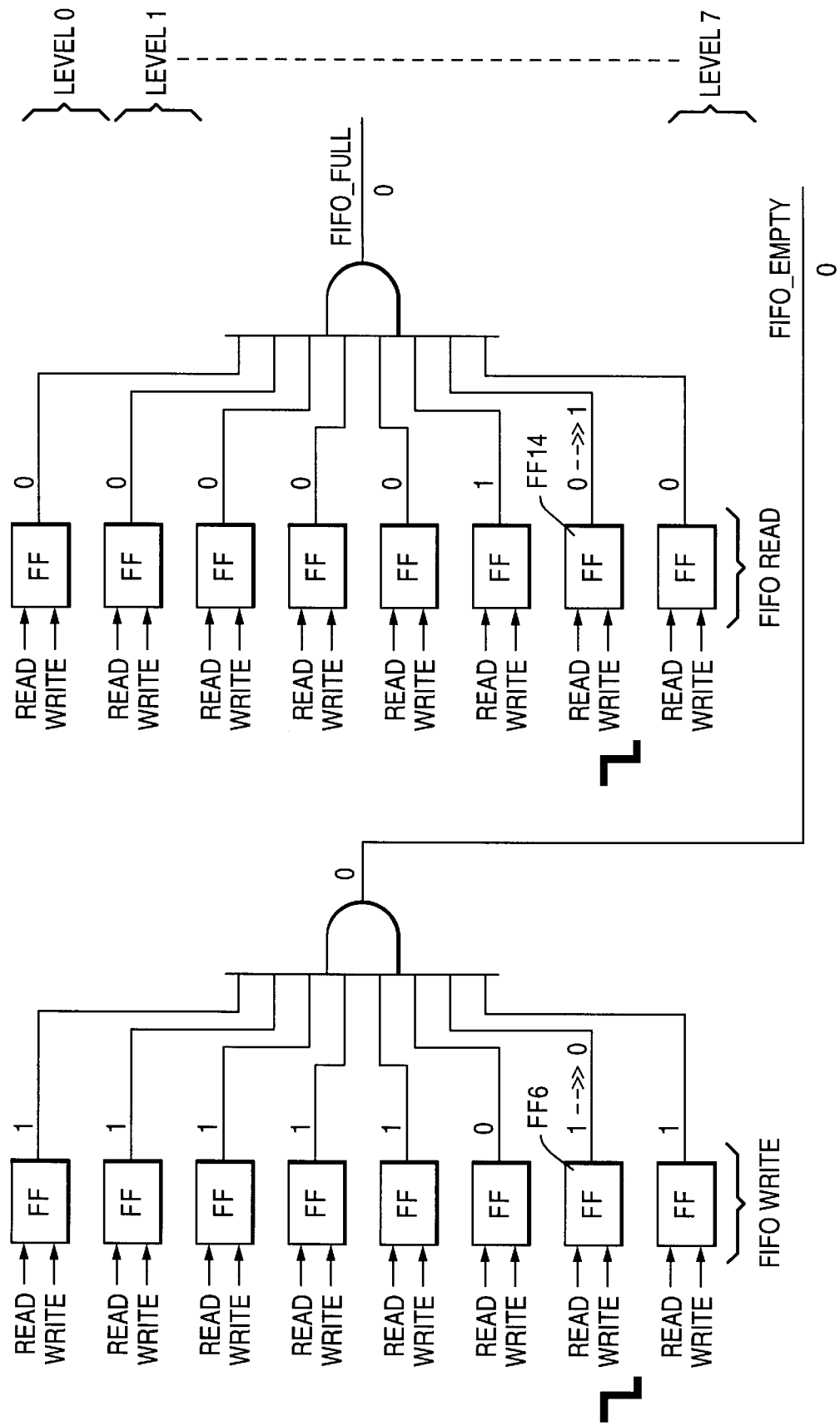
FIG. 19 illustrates the condition of the status registers following the six read operations of FIG. 18, and following a subsequent write operation.

Now, the sender writes data to level 6, as indicated in FIG. 19. FIG. 19 indicates the current condition of the status cells, after this last write operation.

The preceding discussion explained the generation of the FIFO__FULL and FIFO__EMPTY signals. The following discussion will explain how these signals are synchronized with two different clocks, namely, that of the sender and that of the receiver.

Structure of Memory Cells FF

Figure 21:
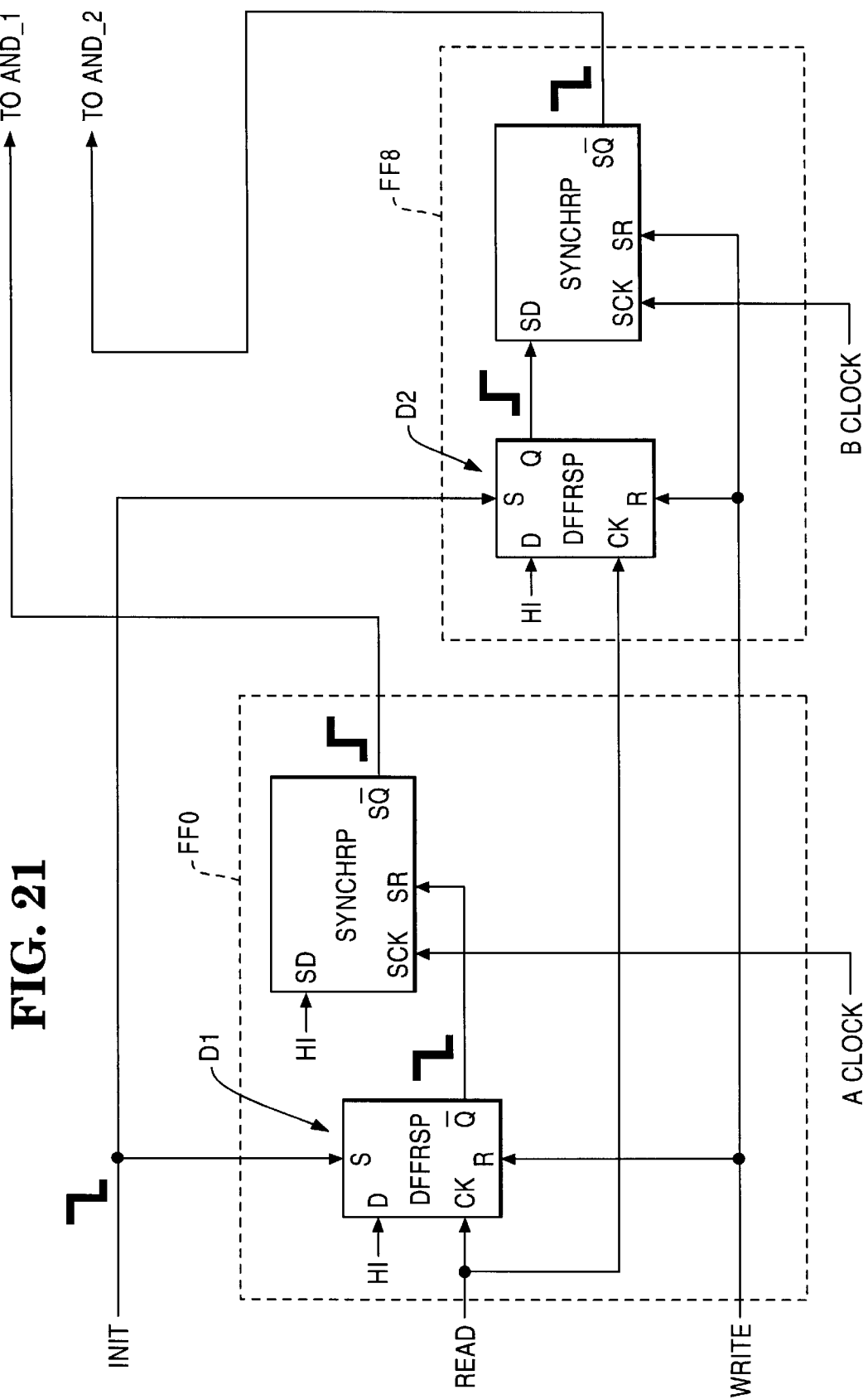
FIG. 21 illustrates the internal construction of FF0 and FF8 of FIG. 20, and how FF0 and FF8 respond to the INIT (initialization) signal.

The memory cells FF0–FF15 each occupy a respective dashed box in FIG. 20. All status cells FF0–FF7 are identical. All status cells FF8–FF15 are identical. A pair of these status cells is shown in FIG. 21. Each of the status cells FF0–FF15 contains a D flip-flop, labeled DFFRSP (which is an acronym for D Flip-Flop having Synchronous Set and Reset), and a block labeled SYNCH RP.

The SYNCH RP block represents circuitry capable of synchronizing an output signal from a flip-flop to a clock signal from an exterior source. In one embodiment, the SYNCH RP includes flip-flop like circuitry capable of latching a signal at an input terminal to an output terminal whenever a clock pulse is received and the SYNCH RP is not in a reset state.

Behavior of DFFRSP

Figure 22:
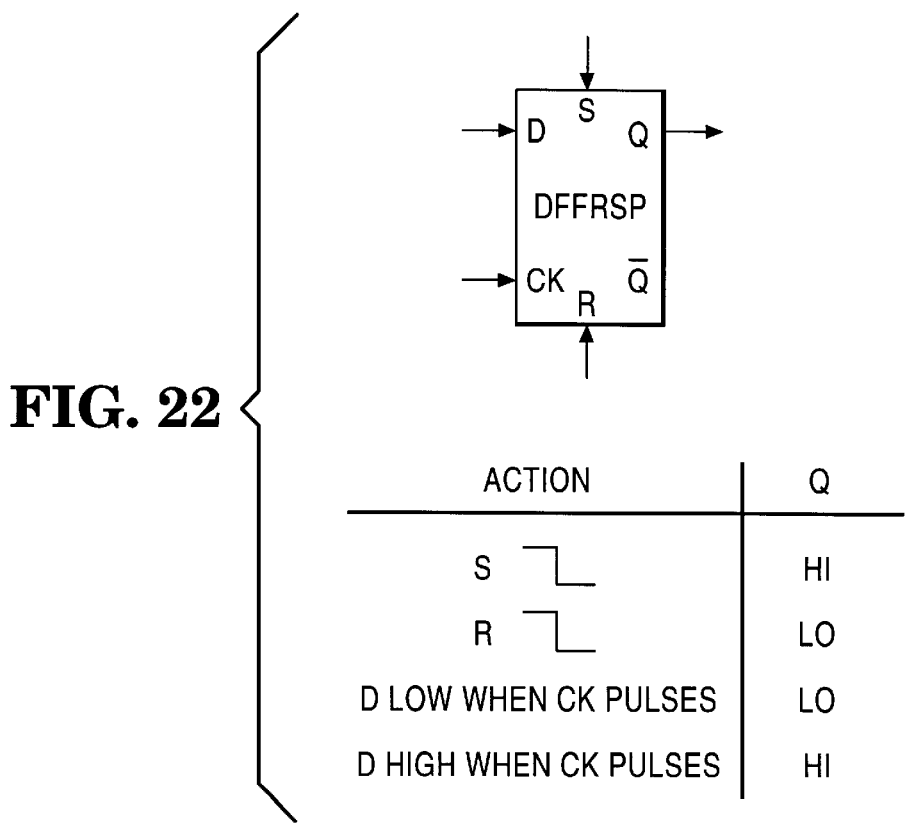
FIG. 22 illustrates the input-output response of element D1 in FIG. 21.

FIG. 22 illustrates the input-output behavior of the DFFRSP (herein called a D flip-flop). The S (set) input drives the Q output HI. The R (reset) input drives the Q output low. The CK (clock) input causes the signal (HI or LO) appearing at the D (data) input to appear at the Q output. Q-bar is the logic inverse of Q.

Behavior of SYNCH RP

Figure 23:
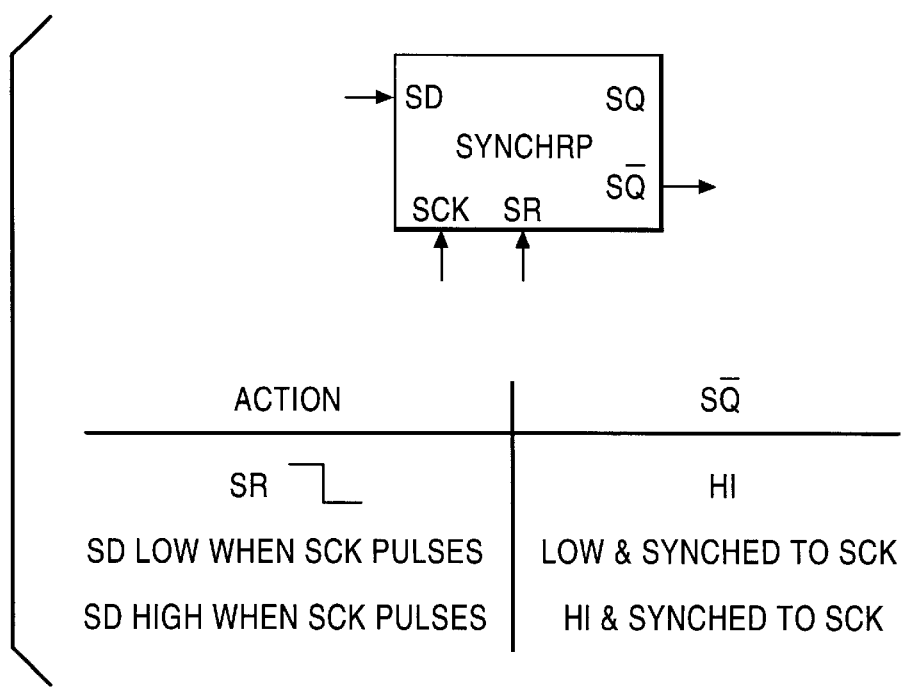
FIG. 23 illustrates the input-output response of element D2 in FIG. 21.

FIG. 23 illustrates the input-output behavior of the SYNCH RP. The SR input allows the SYNCH RP to be placed into and out of a reset condition. When the SR input goes LO, the SYNCH RP is placed into the reset condition and the SQ-bar output is held HI. When the SR input goes HI, the SYNCH RP is released from the reset condition and is able to latch the data present at the SD input on the next clock pulse of the SCK input.

Initialization Response of FF's to INIT Signal

An INIT (initialization) signal is shown.in FIG. 21. The same signal is shown in the upper left corner of FIG. 20. This signal is issued, by a computer, processor, or other agent interested in transferring data via the FIFO (not shown). The INIT signal causes the following events.

It reaches the S (set) input, in FIG. 21, of the D flip-flop D1. This causes the Q-bar output of that flip-flop to go LO, as indicated. This LO signal is fed to the SR input of the SYNCH RP in FF0, causing the SQ-bar output to go HI, as indicated. (The HI signal at SQ-bar actually occurs two clock cycles later, as will be later explained.) This HI signal corresponds to the "1" signal shown, for example, in FIG. 2, at FF0. This HI (or "1") signal indicates that level 0 (to which FF0 corresponds) is empty.

The INIT signal in FIG. 21 also reaches the S (set) input of the D flip-flop in FF8. This causes the Q output of this flip-flop to go HI, as indicated. This HI output is fed to the SD (D: data) input of the SYNCH RP in FF8. This HI signal propagates through the SYNCH RP and appears (inverted) at the SQ-bar output two clock cycles later. (The delay of two clock cycles will be explained later.) This LO signal (at SQ-bar) corresponds to the LO signal, for example, in FIG. 2, at FF8. This LO (or "0") signal indicates that level 0 (to which FF8 corresponds) is empty.

Therefore, the INIT signal sets all FF's to the condition shown in FIG. 2. The FIFO__EMPTY signal in FIG. 2 is HI, and the FIFO__FULL signal is LO. The FIFO is ready to accept data.

Response of FF's to WRITE Signal

Figure 24:
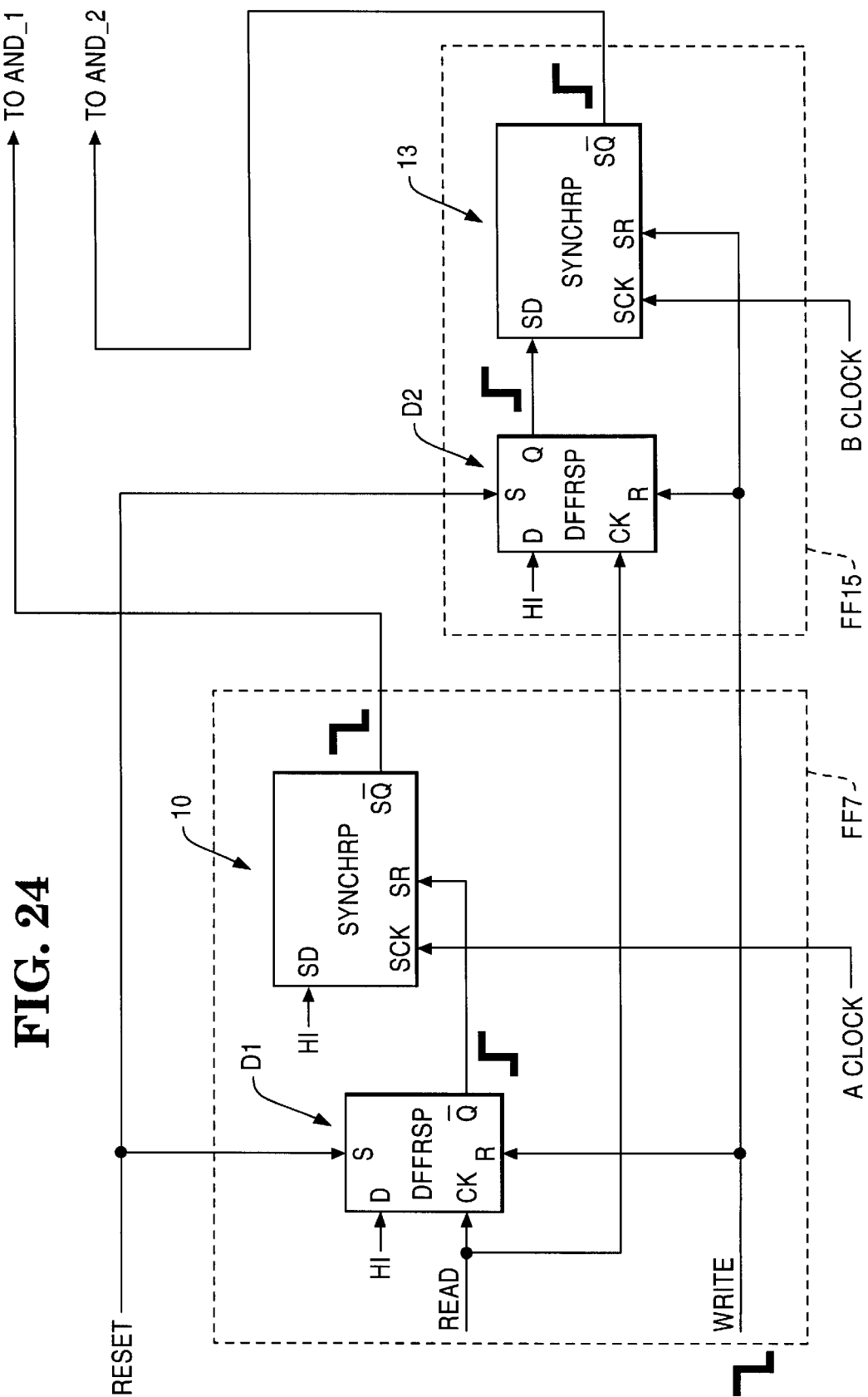
FIG. 24 illustrates how FF0 and FF8 respond to a WRITE signal.

When the sender writes data to a level in the FIFO, it also applies a WRITE signal to the corresponding FF's in FIG. 2, as explained above. FIG. 24 illustrates the events which the WRITE signal causes within each FF (or status cell).

The WRITE signal is fed to the R (reset) input of the D flip-flop D1 in FF0. This drives the Q-bar output HI, as indicated. This HI signal is fed to the SR (R: reset) input of the SYNCH RP, and releases the SYNCH RP from its reset condition. (The previous LO signal applied to SR held the SYNCH RP in the reset condition.)

Because the SYNCH RP is now released from the reset state, when the A CLOCK signal occurs (the A CLOCK signal is the clock signal used by system A, which is the receiver in this example), the SYNCH RP latches in the data present at SD (D: data). This data signal is always HI. Two clock pulses later (explained later), the data signal appears at SQ-bar, but inverted. That is, SQ-bar is LO.

This LO signal of SQ-bar corresponds to the LO (or "0")signal appearing at FF0 in FIG. 3. That is, the WRITE signal causes FF0 to toggle from "1"to "0", indicating that data is now present.

In FIG. 24, the WRITE signal is also fed to both the R (reset) input of the D flip-flop D2 in FF8, and to the SR (R: reset) input of the SYNCH RP in FF8. The WRITE signal first causes the SYNCH RP to enter the reset state: SQ-bar goes HI, as indicated. This HI state of SQ-bar is then maintained by driving the D flip-flop into the reset state, which drives output Q HI, as indicated.

Restated, the WRITE signal toggles the SYNCH RP in FF8 immediately. The WRITE signal will not persist forever, so the HI produced at Q of the D flip-flop D2 is used to maintain the HI at SQ-bar. This HI at Q is clocked through the SYNCH RP by B CLOCK, which is the clock of agent B, which is the sender in this example.

Response of FF's to READ Signal

Figure 25:
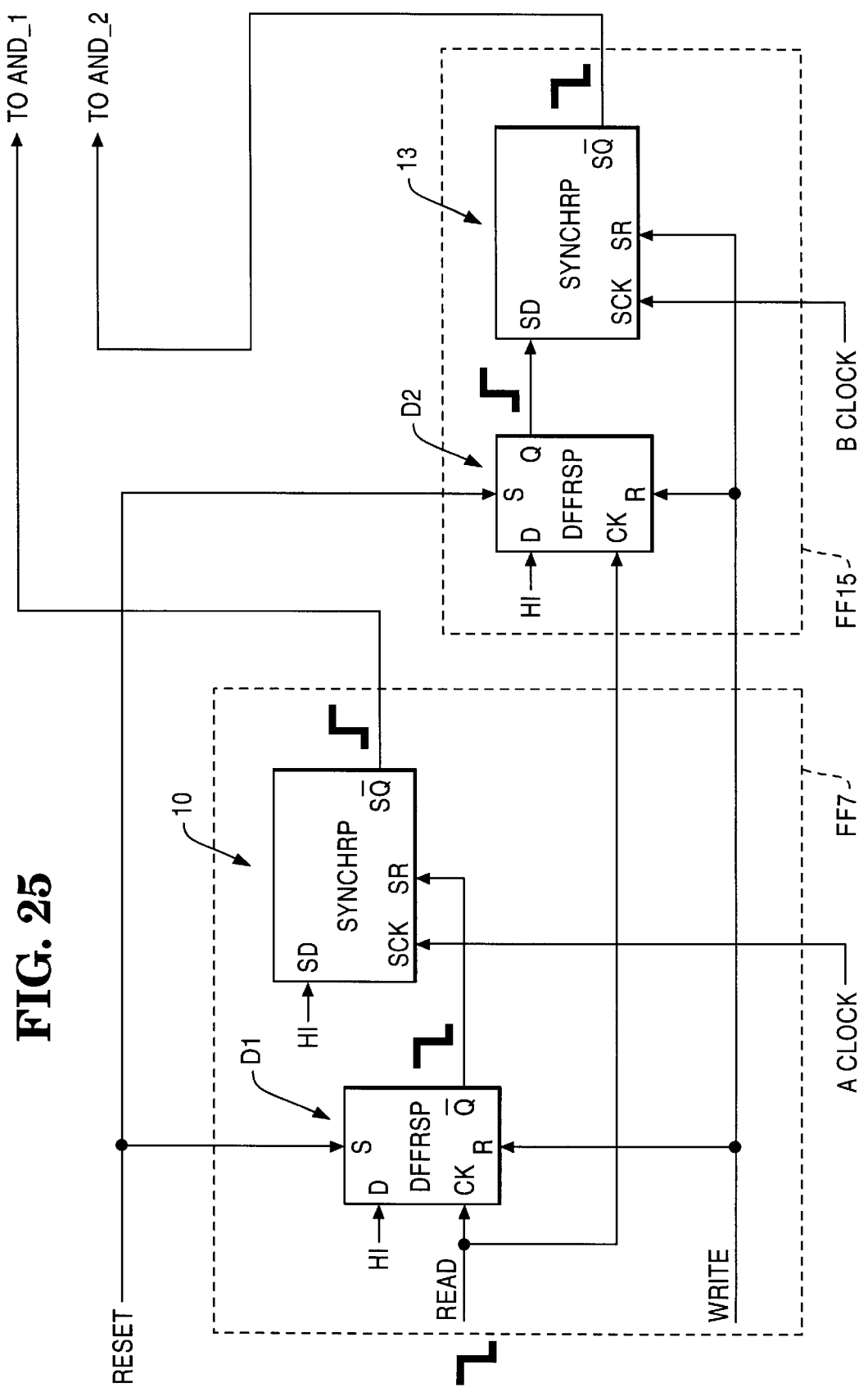
FIG. 25 illustrates how FF0 and FF8 respond to a READ signal.

When the receiver reads data from a level in the FIFO, it also applies a READ signal to the corresponding FF's, as explained above. FIG. 25 illustrates the events which the READ signal causes.

The READ signal is fed to the CK (clock) inputs of both D flip-flops D1 and D2. This drives the Q-bar output of D1 LO, as indicated.

This LO signal is fed to the SR (reset) input of the SYNCH RP 10, and holds the SYNCH RP 10 in its reset condition. Output SQ-bar goes HI, as indicated. This HI signal is fed to AND_1 in FIG. 20, and contributes to the FIFO_EMPTY signal (because reading a level causes the level to be treated as empty).

The READ signal is also fed to both the CK (clock) input of the other D flip-flop, D2. The READ signal first causes D2 to latch the HI signal at its D input, causing output Q to go HI, as indicated.

This HI output of Q at D2 is fed to the SD (D: data) input of SYNCH RP 13. This HI input appears, inverted, at the SQ-bar output, two clock cycles later. SQ-bar goes LO, as indicated.

Restated, the READ signal toggles the SYNCH RP 10 immediately (because Q-bar of D1 drives this SYNCH RP into the reset state immediately (strictly, after a propagation delay which is small compared with clock speeds). The READ signal will not persist forever, so the LO produced at Q-bar output of flip-flop D1 is used to maintain the HI at SQ-bar. This LO at Q-bar of D1 is clocked through the SYNCH RP 10 by A CLOCK, which is the clock of agent A, which is the receiver in this example.

SYNCH RPs

Figure 26:
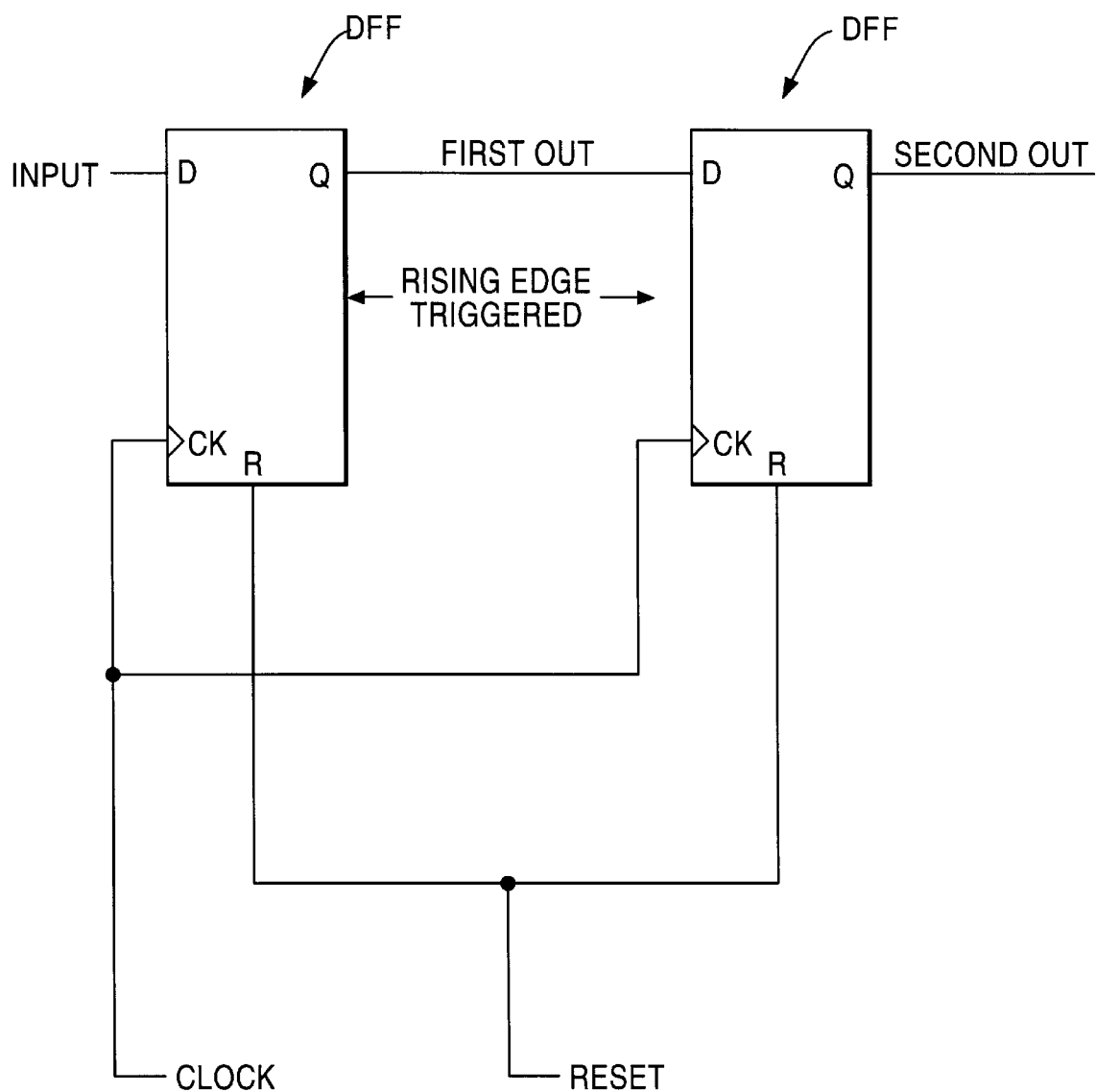
FIG. 26 illustrates the construction of a SYNCH RP, shown in both FF0 and FF0.
Figure 27:
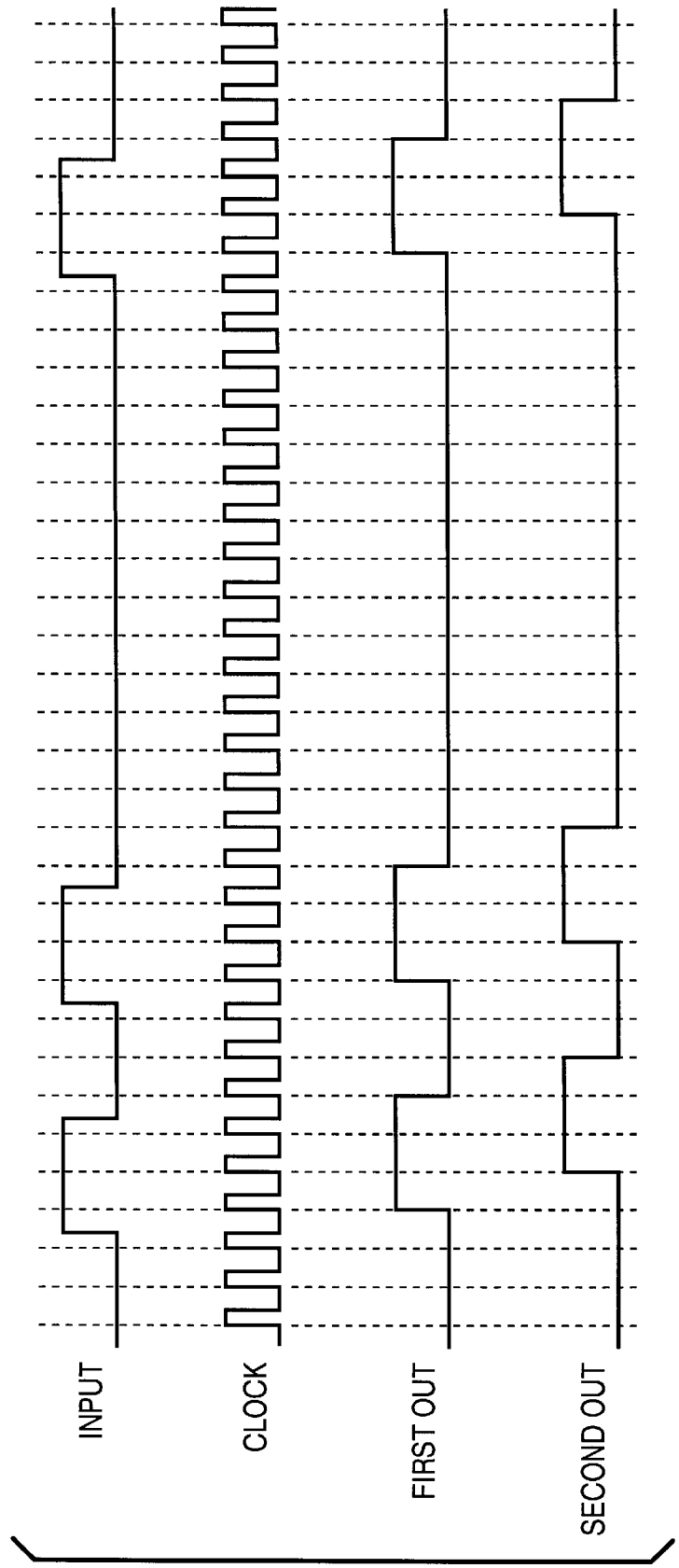
FIG. 27 illustrates the operation of the SYNCH RP.

FIG. 26 illustrates the internal structure of the SYNCH RPs. FIG. 27 illustrates how the DATA IN signal, also shown in FIG. 26, is synchronized with the CLOCK, and how a two-clock-cycle delay is imposed.

The FIRST OUT terminal produces a signal which is synchronous with the clock. (The term "synchronous" is a term of art. Definitions are given later in the Specification.

A basic premise in the concept of synchronicity is this: a signal is synchronous with a clock signal if the signal is ready to be read at the same time (or within a predetermined time) as the clock signal occurs.) In the SYNCH RP, the FIRST OUT signal is synchronous with the FIRST TRIGGERING EDGE of the CLOCK which occurs after the INPUT data has stabilized.

The SECOND OUT terminal produces a signal which is also synchronous with the clock, but delayed from the FIRST OUT signal by one clock cycle.

Thus, the SYNCH RP (a) causes the SECOND OUT signal to be synchronous with the CLOCK, but (b) delayed by two CLOCK cycles.

Counters and Decoders: FIG. 20

The preceding discussion stated that READ and WRITE signals are applied to the FF's in FIG. 2 in sequence. Generation of READ and WRITE signals in sequence to eight FF's will now be explained.

When the receiver, computer A, reads the FIFO, it produces an A_RD (an acronym for A-READ) signal in FIG. 20, upper left. Each A_RD signal clocks a 3-bit counter CTR. Thus, for the first read operation, the counter output is changed from 000 to 001. For the second, the counter output is changed from 001 to 011, and so on.

The counter CTR counts from 000 to 111 and then starts over at 000. (The counter CTR continually counts in one direction.)

The three-bit output of counter CTR feeds a 3-to-8 decoder labeled "3-to-8." This decoder pulls a single line in bus LL high, corresponding to the three-bit output of the counter. For example, if the three-bit output of the counter is 000, the decoder pulls the line labeled "L0"HI. ("L0"is L-ZERO, not the word LO.) If the three-bit output of the counter is 001, the decoder pulls line L1 HI.

Thus, lines L0 through L1 go HI in sequence. This sequence causes the CK input of the D1 flip-flops to go HI in sequence. That is, the CK of D1 in FF) goes HI first; all other CK's in FF0 through FF7 are LO.

Then, the CK of D1 in FF1 goes HI; all other CK's in FF0 through FF7 are LO.

Then, the CK of D1 in FF2 goes HI; all other CK's in FF0 through FF7 are LO, and so on.

NAND gates N, plus inverter I, cause this sequential operation, together with the counter CTR and the 3-to-8 decoder. Of course, there are other ways, known in the art, to actuate eight READ lines, one-at-a-time, in sequence.

This explains how a READ signal is applied to each FF, in sequence, as discussed above in connection with FIGS. 3–5. A WRITE signal is applied to each FF, in sequence, in the same way, by the counter CTR fed by the B_WR (an acronym for B WRITE) shown in the upper left part of FIG. 20.

Important Points

Point 1. The following facts will be explained.

FACT: The WRITE signal in FIG. 24 can actuate the FIFO_FULL signal, because SYNCH RP 13 feeds AND gate 20 in FIG. 20.

FACT: Conversely, the same WRITE signal can DE-actuate the FIFO_EMPTY signal, because SYNCH RP 10 in FIG. 24 feeds AND gate 23 in FIG. 20.

FACT: This actuation of the FIFO_FULL signal is immediately produced by the WRITE signal.

FACT: This DE-actuation of the FIFO_EMPTY signal is synchronous with the receiver's clock, and occurs after a synchronization delay.

FACT: The READ signal in FIG. 25 can DE-actuate the FIFO_FULL signal, because SYNCH RP 13 feeds AND gate 20 in FIG. 20.

FACT: Conversely, the same READ signal can actuate the FIFO_EMPTY signal, because SYNCH RP 10 in FIG. 24 feeds AND gate 23 in FIG. 20.

FACT: This actuation of the FIFO_EMPTY signal is immediately produced by the READ signal.

FACT: This DE-actuation of the FIFO_FULL signal is synchronous with the sender's clock, and occurs after a synchronization delay.

Explanation of FACTS

In the examples under consideration, computer B is the sender, and issues the WRITE signals. Computer A is the receiver, and issues the READ signals.

Effects of WRITE Signal

In FIG. 24, the WRITE signal has the potential to cause two main effects: it DE-actuates the FIFO_EMPTY signal, in FIGS. 2 and 20, via the signal on the line TO AND_1 in FIG. 24, and it actuates the FIFO_FULL signal, via the signal on the line TO AND_2.

That is, assume that seven levels, 0 through 6, of the FIFO are full. AND_2 in FIGS. 2 and 20 presently receives "1" signals from the seven status cells FF8–FF14, and a signal of "0" from cell FF 15. This AND gate produces an output of "0". The FIFO_FULL signal is not actuated.

When computer B writes to level 8 of the FIFO, a WRITE signal reaches FF 15 (provided an intervening READ signal does not occur). This WRITE signal is shown in FIG. 24. The output of FF15 is driven to "1". Now, AND_2 in FIG. 20 toggles from "0"to "1"; it produces a FIFO_FULL signal.

The synchronization is significant. This FIFO_FULL signal is caused by the SYNCH RP 13 in FIG. 24. As stated above, this SYNCH RP is toggled immediately by a WRITE signal. That is, there is no synchronization delay in the actuation of the FIFO-FULL signal. Further, the agent (computer B) which actuates the signal is also the agent which caused the full condition in the FIFO, which necessitated the signal.

Considering the converse situation, the same WRITE signals which can actuate the FIFO_FULL signal (as above) can also DE-activate the FIFO_EMPTY signal, produced by AND_1 in FIGS. 2 and 20. This DE-actuation is caused by a WRITE signal reaching flip-flop D1 in FIG. 24.

Different Synchronization

To repeat, a WRITE signal can actuate the FIFO_FULL signal and can DE-actuate the FIFO_EMPTY signal. However, the actuation and DE-actuation are synchronized differently.

The actuation of the FIFO_FULL signal is caused by a WRITE signal's re-setting of SYNCH RP 13 in FIG. 24. This re-setting causes the FIFO_FULL signal to occur immediately (subject to propagation delays).

Conversely, the DE-actuation of the FIFO_EMPTY signal is caused by a WRITE signal's toggling of flip-flop D1 in FIG. 24. The DE-actuation occurs after the synchronization delay imposed by SYNCH RP 10. The DE-actuation does not occur immediately after the WRITE signal, which is produced by the sender, because DE-actuation signal is produced the SYNCH RP 10, which is clocked by the A CLOCK, which is the receiver's clock.

Thus, as to DE-actuation, the sender (computer B) issues the WRITE signal, which allows the DE-actuation of the FIFO_EMPTY signal. However, the DE-actuation of this signal is actually caused by, and is synchronous with, the receiver's (computer A's) clock.

Effects of READ Signal

In FIG. 25, the READ signal has the potential to cause two main effects: it actuates the FIFO_EMPTY signal, in FIGS. 2 and 20, and it DE-actuates the FIFO_FULL signal, shown also in these Figures.

That is, assume that seven levels, 0 through 6, of the FIFO are empty. AND_1 in FIGS. 2 and 20 presently receives "1" signals from the seven status cells FF0–FF6, and a signal of "0" from cell FF7. This AND gate produces an output of "0". The FIFO_EMPTY signal is not actuated.

When computer A reads level 7 of the FIFO, a READ signal reaches FF7 (assume that no intervening WRITE signal occurs). This READ signal is shown in FIG. 25. The output of FF7 is driven to "1". Now, AND gate 23 in FIG. 20 toggles from "0" to "1"; it produces a FIFO_EMPTY signal.

The synchronization is significant. This FIFO_EMPTY signal is caused by the SYNCH RP 10 in FIG. 25. This SYNCH RP is toggled immediately (except for propagation delays through D1 and SYNCH RP 10) by a READ signal. That is, there is no synchronization delay in the actuation of the FIFO-EMPTY signal. Further, the agent (computer A) which actuates the signal is also the agent which caused the empty condition in the FIFO, which necessitated the signal.

Considering the converse situation, the same READ signals which can actuate the FIFO_EMPTY signal (as above) can also DE-activate the FIFO_FULL signal, produced by AND gate 20 in FIGS. 2 and 20. This DE-actuation is caused by a READ signal reaching flip-flop D2 in FIG. 25.

To repeat, a READ signal can actuate the FIFO_EMPTY signal and can DE-actuate the FIFO_FULL signal. However, the actuation and DE-actuation are synchronized differently.

The actuation of the FIFO_EMPTY signal is caused by a READ signal's re-setting of SYNCH RP 10 in FIG. 25, via the Q-bar output of D1. The FIFO_EMPTY signal occurs immediately (subject to propagation delays) after the READ signal.

Conversely, the DE-actuation of the FIFO_FULL signal is caused by a READ signal's toggling of flip-flop D2 in FIG. 25. The DE-actuation occurs after the synchronization delay imposed by SYNCH RP 13. The DE-actuation does not occur immediately after the READ signal, which is produced by the receiver, because DE-actuation signal is produced the SYNCH RP 13, which is clocked by the B CLOCK, which is the sender's clock.

Thus, as to DE-actuation, the receiver (computer A) issues the READ signal, which allows the DE-actuation of the FIFO_FULL signal. However, the DE-actuation of this signal is actually caused by, and is synchronous with, the sender's (computer B's) clock.

Point 2. The FIFO holds data while en route from the sender to the receiver. The data transmission is one-way. If the receiver wishes to send data to the sender, then a second FIFO, and a duplicate of the invention of FIG. 20 can be provided.

Point 3. The invention allows the sender to load the FIFO with one data word for each clock cycle of the sender, until the FIFO becomes full. At this time, the FIFO_FULL flag appears (immediately, subject to propagation delays), telling the sender to refrain from loading further data.

Conversely, the invention allows the receiver to read one word from the FIFO, for each clock cycle of the receiver, until the FIFO becomes empty. At this time, the FIFO_EMPTY flag appears (immediately, subject to propagation delays), telling the receiver to refrain from reading further data.

Figure 28:
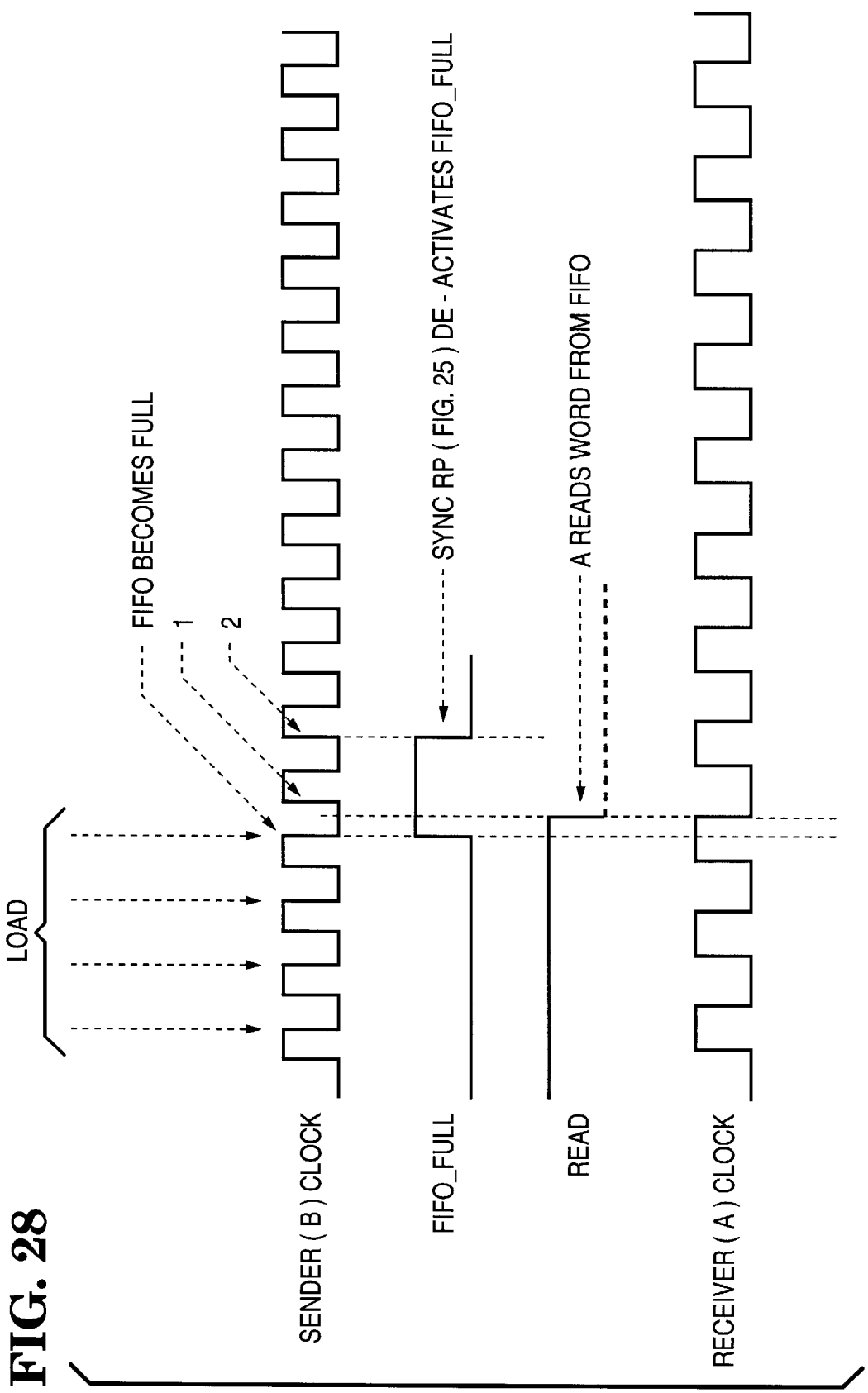
FIG. 28 illustrates one sequence of operation, occurring when the receiver's clock is slower than the sender's clock.

For example, FIG. 28 shows a sender's clock which is faster than the receiver's clock. After the last four LOAD operations by the sender, the FIFO become full, as indicated.

When the receiver reads the FIFO, the READ signal causes the FIFO_FULL signal to DE-actuate at the second rising clock edge of the sender, as indicated. Now the sender can load more data. However, the receiver's reading of the FIFO is not interrupted: the receiver can read one word for its every clock pulse.

In general, if the receiver's clock is slower than the sender's, then the receiver can read a word from the FIFO for every receiver's clock pulse. The sender experiences delays of the type shown in FIG. 28.

Conversely, if the sender's clock is slower than the receiver's, the sender can load one word into the FIFO for every sender's clock pulse.

If the two clocks are sufficiently similar in frequency, but asynchronous, then the sender can load one word for each one of its clock pulses, and the receiver can read one word from the FIFO for each one of its clock pulses.

Point 4. A simple example will illustrate the term "synchronous." Assume that a person wishes to count the number of times that a light flashes. The flashes occur at random times. The light is the sender, and the person's eyes are the receiver. However, people blink their eyes, which may cause a problem in counting the flashes.

That is, assume that the light always stays on for one second when it flashes, and that a blink takes $1/10$ second. Plainly, no matter when a blink occurs, the blinking will not interrupt the counting.

However, if the light stays on for $1/15$ second, it is possible that a flash can coincide with a blink, and be missed. In this situation, it is not possible for a person to accurately count random flashes.

However, if a rule is imposed which states that flashes are only allowed to occur within one second of a beeping sound, then the person can force the eyes to remain open for one second after each beep. The eyes and the flashes have been synchronized. All flashes will be counted.

Thus, one definition of "synchronous" is that a signal (the flash) is synchronized with a clock (the beep) if the signal occurs within a predetermined window with respect to the clock.

Other definitions of "synchronous" are possible.

Point 5. If the sender's clock is much faster than the receiver's clock, the FIFO_EMPTY signal will, in general, never occur, because the sender will always reload the FIFO as soon as the FIFO_FULL signal DE-activates. The receiver will never empty the FIFO. It will, in the general case, contain, at least, seven data words.

Conversely, if the receiver's clock is much faster than the sender's clock, the FIFO_FULL signal will, in general, never occur, because the receiver will always read the FIFO as soon as the FIFO_EMPTY signal DE-activates. The sender will never fill the FIFO. It will, in the general case, contain, at most, one data word.

Thus, in one situation, the FIFO_FULL signal is never used, and, in the other case, the FIFO_EMPTY signal will never be used. Consequently, the invention will probably find widest applicability where the two clocks are close to each other.

Figure 29:
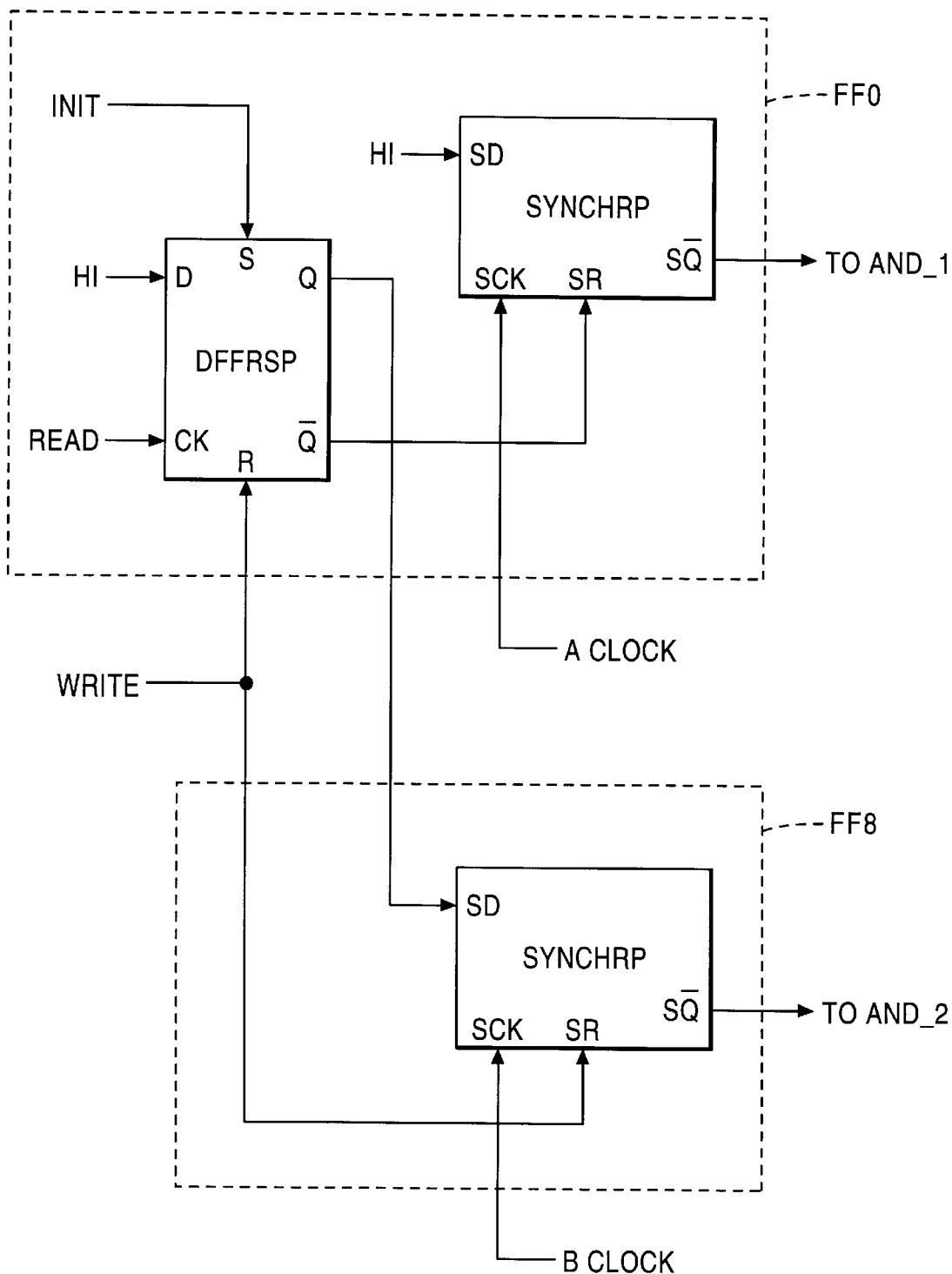
FIG. 29 illustrates an alternate construction of the status registers, FF, in FIG. 20.

Point 6. FIG. 21 indicates that both flip-flops D1 and D2 receive the same inputs. Consequently, it may be possible to replace the two flip-flops in each pair of FFs with a single flip-flop D3, connected as in FIG. 29.

Point 7. It is not necessary that the FIFO hold data moving between computers. Data transfers between other types of devices can use the invention.

Point 8. A write operation and a read operation can be referred to generically as an operation which processes one level of the FIFO. The write operation loads data into the level, while the read operation reads a level, and is treated as emptying the level. Both the read and write can be referred to as a "FIFO level operation."

Numerous substitutions and modifications can be undertaken without departing from the true spirit and scope of the invention.

What is desired to be secured by Letters Patent is the invention as defined in the following claims:

1. A status register for a FIFO which has N levels and holds data en route from a SENDER to a RECEIVER, comprising:
   a) a FIFO FULL indicating system, including:
      i) a first plurality of D-type flip-flops, one corresponding to each level of said FIFO;
      ii) first synchronization means for synchronizing an output signal of each of said D-type flip-flops in said first plurality of D-type flip-flops with a first clock signal; and
      iii) first logic means for indicating when the outputs of all of said first synchronization means are set;
   b) a FIFO EMPTY indicating system, including:
      i) a second plurality of D-type flip-flops, one corresponding to each level of said FIFO;
      ii) second synchronization means for synchronizing an output signal of each of said D-type flip-flops in said second plurality of D-type flip-flops with a second clock signal; and
      iii) second logic means for indicating when the outputs of all of said second synchronization means are set;
   c) means for toggling the corresponding D-type flip-flop in the first plurality of D-type flip-flops as each level of said FIFO is loaded with data; and
   d) means for toggling the corresponding D-type flip-flop in the second plurality of D-type flip-flops as each level of said FIFO is read;
   e) wherein said first logic means outputs a signal indicative of whether said FIFO is full and said second logic means outputs a signal indicative of whether said FIFO is empty.

* * * * *